US 011428424B2

(12) United States Patent
Jung et al.

(10) Patent No.: US 11,428,424 B2
(45) Date of Patent: Aug. 30, 2022

(54) HUMIDIFICATION AND AIR CLEANING APPARATUS

(71) Applicant: LG ELECTRONICS INC., Seoul (KR)

(72) Inventors: Jaehyuk Jung, Seoul (KR); Seungdeok Yang, Seoul (KR); Seokho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/113,239

(22) Filed: Dec. 7, 2020

(65) Prior Publication Data

US 2021/0190345 A1 Jun. 24, 2021

(30) Foreign Application Priority Data

Dec. 6, 2019 (KR) .................. 10-2019-0161479

(51) Int. Cl.
| F24F 8/10 | (2021.01) |
| F24F 6/16 | (2006.01) |
| F04D 29/28 | (2006.01) |
| B01D 46/42 | (2006.01) |

(52) U.S. Cl.
CPC ............ *F24F 8/10* (2021.01); *B01D 46/4236* (2013.01); *F04D 29/281* (2013.01); *F24F 6/16* (2013.01); *B01D 2279/40* (2013.01)

(58) Field of Classification Search
CPC .. F24F 8/10; F24F 6/16; F04D 29/281; B01D 46/4236
See application file for complete search history.

(56) References Cited

U.S. PATENT DOCUMENTS 10,330,104 B2 * 6/2019 Son ..................... F04D 29/681

FOREIGN PATENT DOCUMENTS

| EP | 0 942 175 | | 9/1999 |
| EP | 1688 623 | | 8/2006 |
| EP | 3 163 178 | | 5/2017 |
| JP | 2009074385 A | * | 4/2009 |
| KR | 10-2017-0051107 | | 5/2017 |

OTHER PUBLICATIONS

European Search Report issued in Application No. 20212069.7 dated May 4, 2021.

* cited by examiner

*Primary Examiner* — Robert A Hopkins
(74) *Attorney, Agent, or Firm* — KED & Associates LLP

(57) ABSTRACT

A humidification and air cleaning apparatus is provided, in which a wave having a predetermined cycle is formed on a plurality of blades of a blower fan, such that operating noise caused by a flow of discharged air may be minimized, and a wave is formed at a trailing edge, such that a phase difference may be formed for air to be separated, and air flow noise of the discharged air may be reduced.

18 Claims, 18 Drawing Sheets

HUMIDIFICATION AND AIR CLEANING APPARATUS

CROSS-REFERENCE TO RELATED APPLICATION(S)

This application claims priority under 35 U.S.C. § 119 to Korean Application No. 10-2019-0161479, filed in Korea on Dec. 6, 2019, whose entire disclosure(s) is/are hereby incorporated by reference.

BACKGROUND

1. Field

A humidification and air cleaning apparatus is disclosed herein.

2. Background

Air conditioning apparatuses include air conditioners that control a temperature of air, air cleaners that remove foreign substances from air to maintain air cleanliness, humidifiers that increase humidity in the air, and dehumidifiers that reduce humidity in the air. Typical humidifiers are classified into a vibration type, which atomizes water on a vibrating plate and discharges it into air, and a natural evaporation type which evaporates water in a humidification filter.

The natural evaporation type humidifier is classified into a disc type humidifier, which rotates a disc using a drive force and allows water to naturally evaporate from the surface of the disc in the air, and a humidification filter type humidifier which allows water to naturally evaporate from a wet humidification medium by flowing air.

Korean Laid-Open Patent Publication No. 10-2017-0051107 (hereinafter referred to as the "related art document"), which is hereby incorporated by reference, discloses an apparatus for both humidification and air cleaning.

However, the humidification and air cleaning apparatus disclosed in the related art document has a problem in that when a blower fan operates at a high speed to increase an air volume, a lot of noise may be generated due to the increased air volume.

BRIEF DESCRIPTION OF THE DRAWINGS

Embodiments will be described in detail with reference to the following drawings in which like reference numerals refer to like elements, and wherein.

DETAILED DESCRIPTION

Figure 1:
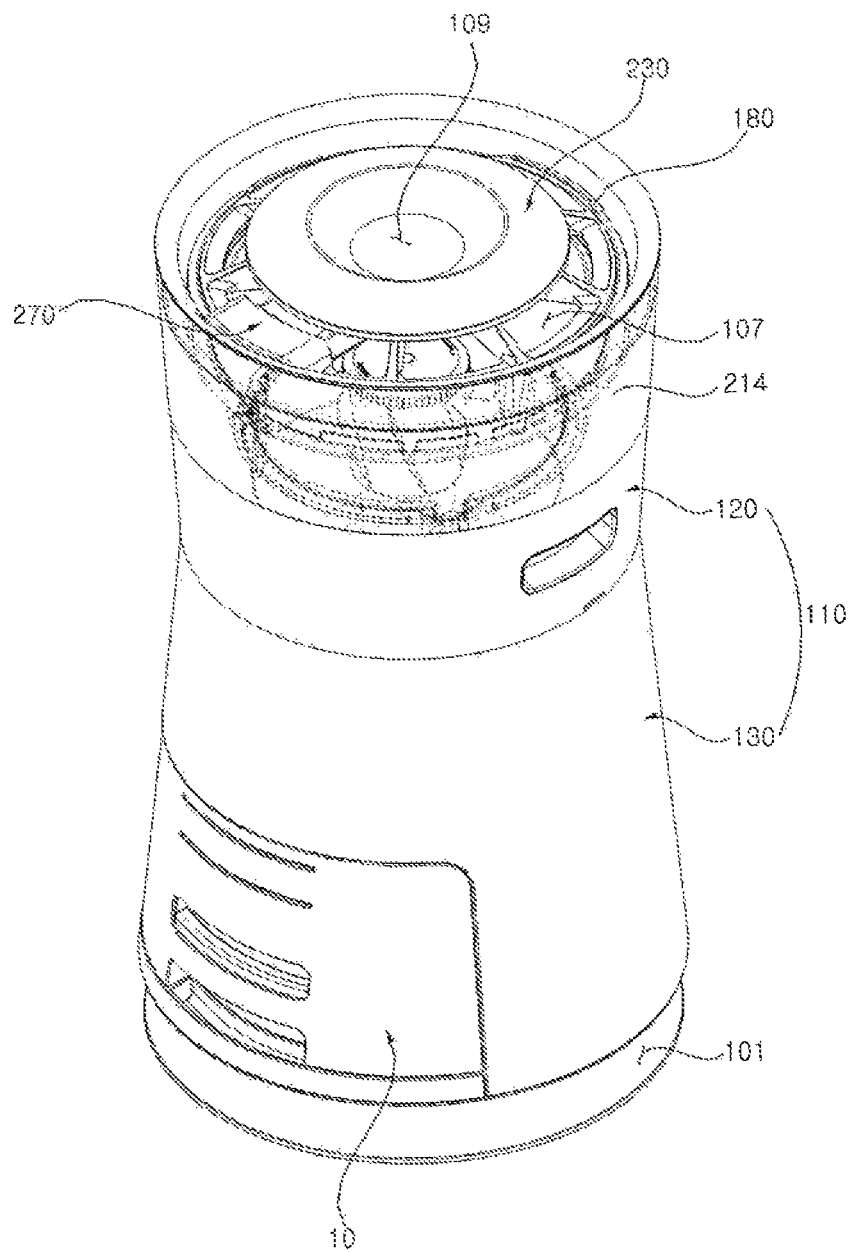
FIG. 1 is a perspective view of a humidification and air cleaning apparatus according to an embodiment.

Advantages and features of embodiments and methods of accomplishing the same will be more clearly understood from embodiments described below with reference to the accompanying drawings. However, the embodiments are not limited to the following embodiments but may be implemented in various different forms. The embodiments are provided only to complete disclosure and to fully provide a person having ordinary skill in the art to which embodiments pertains with a category, and embodiments will be defined by the scope of the appended claims. Wherever possible, like reference numerals generally denote like elements through the specification.

Hereinafter, embodiments will be described with reference to the accompanying drawings.

Figure 2:
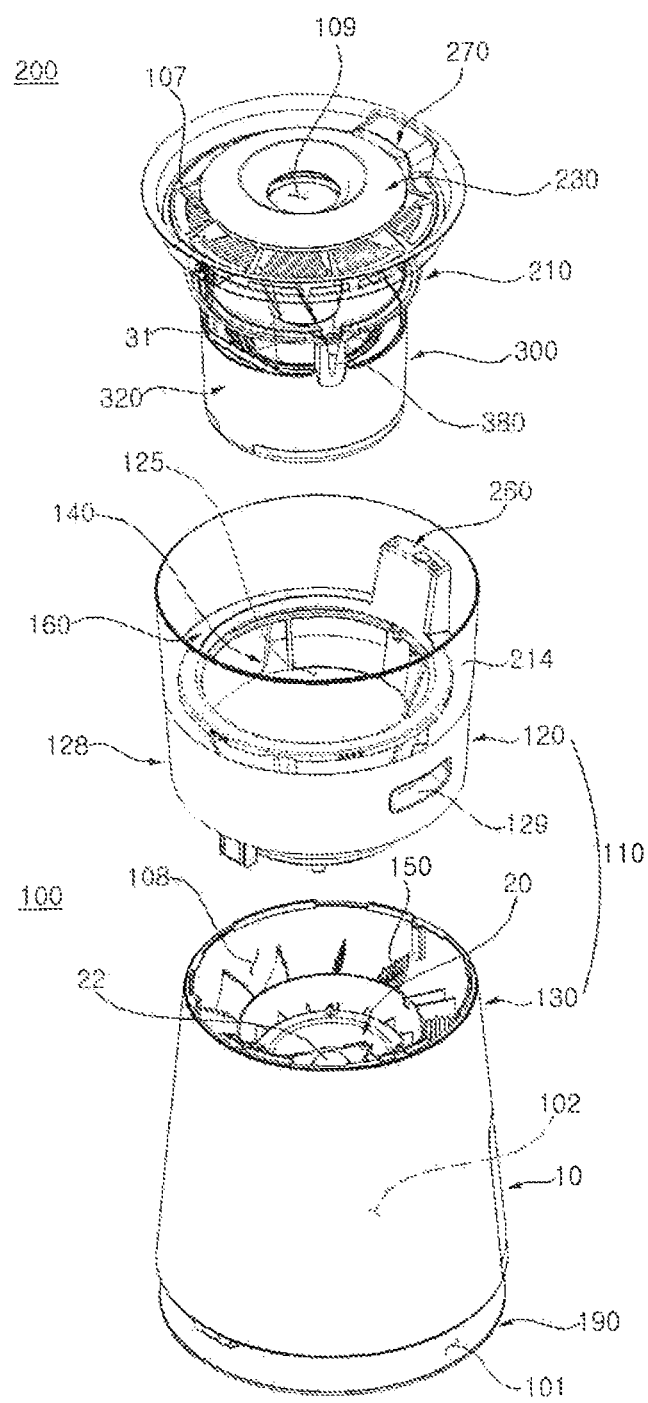
FIG. 2 is an exploded perspective view of the humidification and air cleaning apparatus of FIG. 1.
Figure 3:
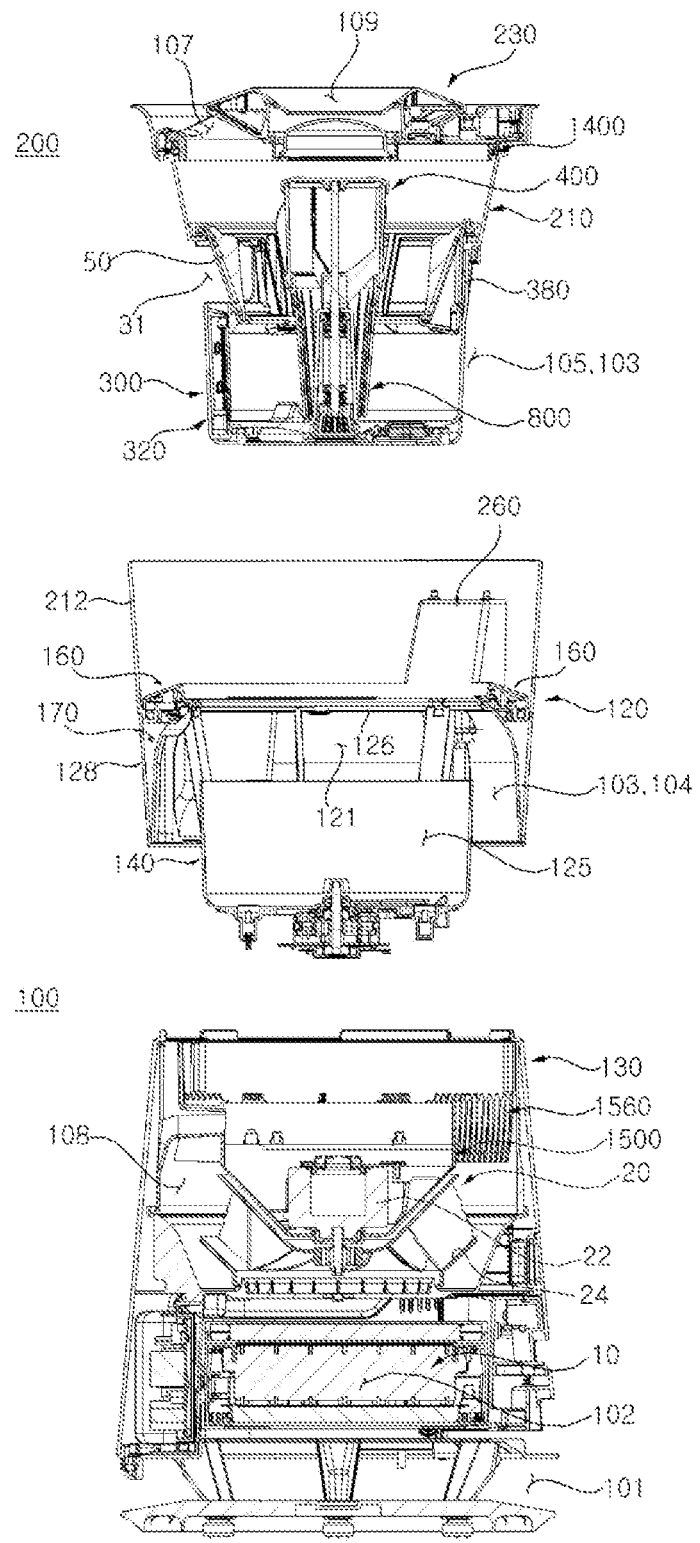
FIG. 3 is a front cross-sectional view of the humidification and air cleaning apparatus of FIG. 2.

FIG. 1 is a perspective view of a humidification and air cleaning apparatus according to an embodiment. FIG. 2 is an exploded perspective view of the humidification and air cleaning apparatus of FIG. 1. FIG. 3 is a front cross-sectional view of the humidification and air cleaning apparatus of FIG. 2.

Referring to FIGS. 1 to 3, an humidification and air cleaning apparatus according to this embodiment may include an air cleaning module 100 and an air humidification module 200 located over the air cleaning module 100.

The air cleaning module 100 may take in and filter external air, and may provide the filtered air to the air humidification module 200. The air humidification module 200 may be supplied with the filtered air, may humidify the filtered air to provide moisture, and may discharge the humidified air to the outside.

The air humidification module 200 may include a water tank 300 that stores water. When the air humidification module 200 is separated from the air cleaning module 100, the water tank 300 may be separated along with the air humidification module 200. The air humidification module 200 may be detachably located over the air cleaning module 100.

A user may upwardly separate the air humidification module 200 from the air cleaning module 100, and may easily clean the separated air humidification module 200. Further, the user may clean an interior of the air cleaning module 100, from which the air humidification module 200 is separated. When the air humidification module 200 is separated, a top surface of the air cleaning module 100 is open to the user.

The air cleaning module 100 may include a filter assembly 10, which will be described hereinafter, and the user may clean the air cleaning module 100 after separating the filter assembly 10 from a base body 110.

The user may supply water into the air humidification module 200. The air humidification module 200 may have a water supply passage 109, through which water may be supplied from outside to the water tank 300.

The water supply passage 109 may be formed separately from a discharge passage 107, through which air is discharged. Air to be discharged may be discharged through the discharge passage 107, and the discharge of air through the water supply passage 109 may be minimized or blocked.

The water supply passage 109 may be formed such that water may be supplied into the water tank 300 at any time. For example, even when the air humidification module 200 is in operation, water may be supplied through the water supply passage 109. For example, even when the air humidification module 200 is coupled to the air cleaning module 100, water may be supplied through the water supply passage 109. For example, even when the air humidification module 200 is separated from the air cleaning module 100, water may be supplied through the water supply passage 109. When water is supplied from above through the water supply passage 109, the water supplied from above may flow into the water tank 300 through the water supply passage 109.

The air cleaning module 100 and the air humidification module 200 may be connected to each other by a connection passage 103. As the air humidification module 200 is separable, the connection passage 103 may be distributedly provided over the air cleaning module 100 and the air humidification module 200. It is only when the air humidification module 200 is placed over the air cleaning module 100 that a flow passage of the air humidification module 200 and a flow passage of the air cleaning module 100 communicate with each other through the connection passage 103. The connection passage formed at the air cleaning module 100 may be defined as a cleaning connection passage 104, and the connection passage formed at the air humidification module 200 is defined as a humidification connection passage 105.

The air cleaning module 100 and the air humidification module 200 will be described hereinafter.

The air cleaning module 100 may include base body 110, filter assembly 10 disposed in the base body 110 and filtering air, and an air blower unit (air blower) 20 disposed in the base body 110 and blowing air. The base body 110 may include an upper body 120 and a lower body 130. The upper body 120 may be stacked on top of the lower body 130, and the upper body 120 and the lower body 130 may be assembled to each other.

Air may flow into the base body 110. An intake passage 101 may be disposed at a lower side of the lower body 130, and a filtering passage 102 may be disposed inside of the lower body 130, and an air flow passage 108 may be disposed at an upper side of the lower body 130.

In order to form the intake passage 101, a lower body supporter 190 may be disposed to support the lower body 130 from below. The filtering passage 102 may be disposed in the lower body 130 and pass through the filter assembly 10.

The air flow passage 108 may be disposed at an upper side of the air blower unit 20. The filtered air, discharged from the air blower unit 20, may flow into the water tank 300 through an air humidification inlet 31.

The filter assembly 10 may be detachably assembled to the base body 110. The filter assembly 10 includes the filtering passage 102, and filters outside air. The filter assembly 10 may be detached from the base body 10 in a horizontal direction. The filter assembly 10 may be disposed to intersect a flow direction of air that flows upstream in a vertical direction. The filter assembly 10 may slide in the horizontal direction and may filter air that flows upstream in the vertical direction. The filter assembly 10 may be disposed in the horizontal direction and may form the filtering passage 102 in the vertical direction. The filter assembly 10 may slide in the horizontal direction with respect to the base body 110.

The air blower unit 20 may be disposed above the filter assembly 10. The air blower unit 20 generates an air flow. The air blower unit 20 may be disposed inside of the base body 110 and may allow air to flow from a lower side to an upper side.

The air blower unit 20 may include a blower housing 1500, a blower motor 22, and a blower fan (not shown). In this embodiment, the blower motor 22 may be disposed at an upper side of the air blower unit 20, and the blower fan may be disposed at a lower side thereof. A motor shaft of the blower motor 22 may be disposed to face downward and may be coupled to the blower fan.

The blower housing 1500 may be disposed inside of the base body 110. The blower housing 1500 may provide a passage for flowing air. The blower motor 22 and the blower fan may be disposed in the blower housing 1500.

The blower housing 1500 may be disposed above the filter assembly 10 and below the upper body 120. The blower housing 1500 may have the air flow passage 108 formed therein. The blower fan may be disposed in the air flow passage 108. The air flow passage 108 may connect the filtering passage 102 and the cleaning connection passage 104.

An operating mechanism of the blower fan may be similar to a centrifugal fan, but a discharge direction of the blower fan may be inclined upward. In this embodiment, the blower fan draws in air from below, and then discharges the air outwardly and upwardly in a radial direction. An outer end of the blower fan may be disposed to be directed upward in the radial direction.

The blower motor 22 may be disposed above the blower fan to minimize contact with the flowing air. The blower motor 22 may be installed so as to be covered by the blower fan. The blower motor 22 is not located in the air flow passage formed by the blower fan, and does not generate resistance to the air blown by the blower fan.

The upper body 120 may form an exterior of the base body 110, and may be assembled to the upper side of the lower body 130. The air humidification module 200 may be detachably held in the upper body 120.

The upper body 120 may include an upper outer body 128 forming an exterior of the base body 110 and coupled to the lower body 130; an upper inner body 140 disposed inside of the upper outer body 128, having the water tank 300 inserted therein, and providing the connection passage 103; and an air guide 170 that connects the upper inner body 140 and the upper outer body 128 and guides air to the water tank 170. A water tank insertion space 125 may be formed inside of the upper inner body 140, and the water tank 300 of the air humidification module 200 may be detachably inserted into the water tank insertion space 125.

An outer side of the upper inner body 140 may communicate with the air flow passage 108. The upper inner body 140 may have an upper inlet 121 that passes through the inside and the outside of the upper inner body 140, and corresponding to the air humidification inlet 31. The air humidification inlet 31 may be disposed inside of the upper inlet 121.

The upper inlet 121 and the air humidification inlet 31 may allow the inside of the water tank 300 and the air flow passage 108 to communicate with each other. The upper inner body 140 has the water tank insertion space 125 so that the water tank 300 may be inserted therein.

As the upper body 120 is disposed to separate the connection passage 103 and the water tank insertion space 125, it is possible to minimize a flow of water in the water tank 300 into the connection passage 103. More particularly, the connection passage 103, divided by the upper inner body 140, may be disposed outside of a space in which water is stored, such that it is possible to prevent water from flowing into the connection passage 103.

The upper inner body 140 may have an open upper side, through which the water tank 300 may be inserted. The upper inner body 140 may form a portion of the cleaning connection passage 104, into which the filtered air may flow.

The upper inner body 140 may have the upper inlet 121 corresponding to the air humidification inlet 31. The upper inlet 121 is not an essential component, and may have any shape as long as the upper body 120 to expose the air humidification inlet 31 to the connection passage 103.

The air guide 170 may guide air, supplied through the cleaning connection passage 104, to the upper inlet 121. The air guide 170 may collect air inwardly which rises along the outside of the base body 110. The air guide 170 may change a flow direction of air flowing from a lower side to an upper side. While changing the flow direction of air, the air guide 170 may minimize an angle of change of the flow direction, so as to minimize flow resistance of air.

The air guide 170 may cover 360 degrees of the outside of the upper inner body 140 along a circumference of the upper inner body 140. The air guide 170 may guide air to the water tank 300 in all 360 degrees of directions of the circumference of the water tank 300. The air guide 170 may collect air inwardly which is guided along the outside of the lower body 130, and may supply the collected air to the water tank 300. With this structure, a flow rate of air supplied to the water tank 300 may be sufficiently secured.

A handle 129 may be formed at the upper body 120. As the air humidification module 200 is held in the upper body 120, the whole humidification and air cleaning apparatus may be lifted up by the handle 129.

The cleaning connection passage (not shown) may be disposed on the outside of the upper inlet 121, and the water tank insertion space 125 may be disposed on the inside thereof. The air, flowing through the cleaning connection passage 104, may pass through the upper inlet 121. When the water tank 300 is held in the water tank insertion space 125, the filtered air, having passed through the upper inlet 121, may flow into the water tank 300.

An outer visual body 214 may be coupled to an upper side of the upper body 120. The outer visual body 214 is a component of a visual body 210, but in this embodiment, the outer visual body 214 is fixed to the upper body 120. Unlike this embodiment, the outer visual body 214 may also be fixed to the air humidification module 200. Further, unlike this embodiment, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material, allowing a user to see inside of the outer visual body 214. The outer visual body 214 may be formed of a transparent or translucent material, for example.

A display module (display) 160 may be disposed at least one of the air cleaning module 100 or the air humidification module 200 to display an operating state to a user. In this embodiment, the display module 160 may be disposed at the base body 110 to display an operating state of the humidification and air cleaning apparatus to a user.

The display module 160 may be disposed on an inner surface the outer visual body 214. The display module 160 may be disposed to be closely adhered to an inner surface of the outer visual body 214. When viewed from a top, the display module 160 may have a donut shape. The water tank 300 may be inserted into the display module 160.

The display module 160 may be supported by the outer visual body 214. An inner edge of the display module 160 may be supported by an upper inner body ring 126. The display module 160 may be integrally formed with a base connector 260. An inside of the display module 160 may be supported by the upper inner body 140, and the outside thereof may be supported by the outer visual body 218.

In this embodiment, when viewed from the top, the display module 160 has a ring shape. Unlike this embodiment, the display module 160 may have an arc shape. A surface of the display module 160 may be formed of, or coated with, a light-reflective material.

Accordingly, when drops of water are formed on the visual body 210, the water drops formed on the visual body 210 may be projected onto or reflected from the surface of the display module 160. When the water drops formed on the visual body 210 flow downward, a same effect is also shown on the display module 160. This effect may give a visual stimulus to a user, such that the user may intuitively recognize that humidification is being performed. The water drop image projected on the display module 160 may have not only an emotional effect of giving a sense of refreshment to a user, but also a functional effect of informing the user of a humidification state.

The display module 160 may have an inclined upper surface. The display module 160 may be inclined toward a user, such that a height of the display module 160 is higher on the inside than on the outside.

The humidification connection passage 105 may be disposed outside of a side wall of the water tank 300. The cleaning connection passage 104 may be disposed outside of the upper inner body 150.

Hereinafter, each component of the air humidification module 200 will be described with reference to FIG. 2 or FIG. 3.

The air humidification module 200 may include water tank 300 that stores water for humidification and detachably disposed on the air cleaning module 100; a water dispensing unit (dispenser) 400 disposed in the water tank 300 and spraying water in the water tank 300; a humidification medium 50 wetted with water sprayed from the water dispensing unit 400 and providing moisture to the flowing air; visual body 210 coupled to the water tank 300 and formed of a transparent material allowing a user to see the inside thereof; a top cover assembly 230 detachably disposed over the visual body 210 and providing the discharge passage 107, through which air is discharged, and the water supply passage 109 through which water is supplied; and a discharge vane 1400 disposed below the top cover assembly 230 and covering the discharge passage 107.

The air humidification module 200 provides humidification to the filtered air. The air humidification module 200 may implement a rain view inside of the water tank 300. The air humidification module 200 may spray and circulate water stored in the water tank 300. The air humidification module 200 may change the stored water into small droplets, and the scattered droplets may come into contact with the filtered air. Humidification and filtering may be performed while the filtered air is humidified with the scattered droplets.

The air humidification module 200 may include the water tank 300, the water dispensing unit 400, the humidification medium 50, the visual body 210, the top cover assembly 230, and handle 180. The handle 180 may be connected to the visual body 210, rotate in the visual body 210, and be held in the visual body 210. A user may simply lift up only the air humidification module 200 by the handle 180, and the handle 180 may be separated from the air cleaning module 100.

In the humidification and air cleaning apparatus according to this embodiment, a power source may be connected to the air cleaning module 100, and the air humidification module 200 may be supplied with power from the air cleaning module 100. As the air humidification module 200 may be separated from the air cleaning module 100, a separate power supply structure may be provided in which power is provided separately to the air cleaning module 100 and the air humidification module 200.

The air cleaning module 100 and the air humidification module 200 may be detachably assembled in the upper body 120, such that the base connector 260 for providing power to the air humidification module 200 may be disposed in the upper body 120. An operation module 240, which requires power, may be disposed at the top cover assembly 230 of the air humidification module 200. A top connector 270, detachably connected to the base connector 260, may be disposed in the air humidification module 200. The top connector 270 may be disposed in the top cover assembly 230.

In this embodiment, the top cover assembly 230 may be separated such that the inner surface of the visual body 210 or the inner surface of the water tank 300 may be cleaned in a convenient manner. The top cover assembly 230 may be detachably installed to the visual body 210. The top cover assembly 230 may be provided with the top connector 270 which may be electrically connected to the base connector 260.

When the top cover assembly 230 is placed on the visual body 210, the top connector 270 is disposed over the base connector 260. The top cover assembly 230 is supplied with electricity from the base connector 260 via the top connector 270.

A water level display unit (display) 247 that displays a water level of the water tank 300 may be disposed near the water supply passage 109. Accordingly, while supplying water, a user may check the water level of the water tank 300 which is not visible. By providing the water level display unit 247 at a position visible to a user while the user supplies water, it is possible to prevent excessive supply of water by the user or prevent overflow of water from the water tank 30.

The water level display unit 247 may be disposed at the top cover assembly 230. A separate power supply structure of the top connector 270 and the base connector 260 may allow effective supply of water from above.

The water tank 300 may be detachably disposed in the upper body 120. The water dispensing unit 400 may be disposed and rotate inside of the water tank 300.

The water tank 300 may include a water tank body 320 in which water is stored; the air humidification inlet 31 formed to pass through a side wall of the water tank body 320; and a water tank body extension part or portion (extension) 380 that extends upward from the water tank body 320 and coupled to the visual body 210.

The water tank body 320 has a bottom surface and a side wall, with an open upper part or portion (opening). The air humidification inlet 31 may pass through the side wall. In this embodiment, the water tank body 320 is formed in a cylindrical shape with an open upper portion. Unlike this embodiment, the water tank body 320 may be formed in various shapes.

The water tank body extension 380 may extend upward from the water tank 300. The water tank body extension 380 may form the air humidification inlet 31. The air humidification inlet 31 may be formed between the water tank body extensions 380.

The air humidification inlet 31 may pass through the side surface of the water tank body 320. The air humidification inlet 31 may be formed in all 360 degrees of directions of a circumference of the water tank body 320.

The water tank body extension 380 may guide water, flowing down from the inner surface of the visual body 210, into the water tank 300. By guiding water flowing down from the visual body 210, noise of dropping water may be minimized. The water tank body extension 380 may be coupled to a lower end of the visual body 210.

In this embodiment, the visual body 210 and the water tank 300 are manufactured separately and assembled afterwards. Unlike this embodiment, the visual body 210 and the water tank 300 may be integrally formed or the water tank 300 may be included in the visual body 210 as a component. For example, a portion of the water tank 300 may be formed of a transparent material by bi-injection molding, in which case the visual body 210 is not manufactured as a separate component.

In this embodiment, the air humidification inlet 31 is formed as a component of the water tank body 320. Unlike this embodiment, the air humidification inlet 31 may also be formed by providing the water tank body extension 380 in the visual body 210.

Further, unlike this embodiment, the air humidification inlet 31 may be formed in such a manner that some of a plurality of water tank body extensions 380 are disposed in the water tank 380 and the other are disposed in the visual body 210. In addition, unlike this embodiment, the air humidification inlet 31 may be formed as a separate component which is distinguished from the visual body 210 and the water tank 300. Moreover, unlike this embodiment, the visual body 210 may have an apertured surface, on which the air humidification inlet 31 may be formed, and the water tank 300 may also have an apertured surface on which the air humidification inlet 31 may be formed.

That is, the air humidification inlet 31 may be formed on either the water tank 300 or the visual body 210. The air humidification inlet 31 may be formed by coupling of the water tank 300 and the visual body 210. Upon providing the air humidification inlet 31 as a component which is distinguished from the water tank 300 and the visual body 210, the component may be disposed between the water tank 300 and the visual body 210. The air humidification inlet 31 may be formed by the coupling of the water tank 300 and the visual body 210.

The visual body 210 may have an upper part or portion and a lower part or portion which is open. When viewed from the top, the open upper portion and the open lower portion of the visual body 210 may have a circular shape. A diameter of the lower opening of the visual body 210 may be smaller than a diameter of the upper opening of the visual body 210.

In this embodiment, the top cover assembly 230 is inserted through the upper opening of the visual body 210, and is detachably disposed on the inner surface of the visual body 210.

The water dispensing unit 400 has a function of supplying water to the humidification medium 50. The water dispensing unit 400 has a function of visualizing the humidification process. The water dispensing unit 400 implements a rain view inside of the air humidification module 200.

The water dispensing unit 400 may draw in water stored in the water tank 300 by rotating humidification housing 800, pump upward the drawn water, and spray the pumped water outwardly in the radial direction. The water dispensing unit 400 may include the humidification housing 800 which draws in water, pumps upward the drawn water, and then sprays the pumped water outwardly in the radial direction.

In this embodiment, the humidification housing 800 may rotate to spray water. Unlike this embodiment, a nozzle may be used instead of the humidification housing 800 to spray water. As water is sprayed from the nozzle, the water may be supplied to the humidification medium 50 and a rain view may also be similarly implemented. Depending on embodiments, water may be sprayed from the nozzle or the nozzle may rotate.

The water sprayed from the humidification housing 800 serves to wet the humidification medium 50. The water sprayed from the humidification housing 800 may be sprayed toward at least either the visual body 210 or the humidification medium 50.

Water sprayed toward the visual body 210 may be used to implement a rain view. Water sprayed toward the humidification medium 50 may be used to humidify the filtered air. The rain view may be implemented by spraying water toward the visual body 210, and then water flowing down from the visual body 210 may be used to wet the humidification medium 50.

In this embodiment, a plurality of nozzles having different heights may be provided for the humidification housing 800. Water discharged from any one of the nozzles may form droplets on the inner surface of the visual body 210 to create a rain view, and water discharged from the other nozzle may wet the humidification medium 50 for use in humidification.

The humidification housing 800 may spray water to the inner surface of the visual body 210, and the sprayed water may flow down along the inner surface of the visual body 210. Droplets, shown in the form of drops of water, may be formed on the inner surface of the visual body 210, and a user may see the droplets through the visual body 210.

More particularly, water flowing down from the visual body 210 may wet the humidification medium 50 for use in humidification. The humidification medium 50 may be wetted with water sprayed from the humidification housing 800 and water flowing down from the visual body 210.

The visual body 210 may be coupled to the water tank 300, and may be disposed above the water tank 300. At least a portion of the visual body 210 may be formed of a material allowing a user to see the inside thereof.

The display module 160 may be disposed outside of the visual body 210. The display module 160 may be coupled to either one of the visual body 210 or the upper body 120.

The display module 160 may be disposed at a position at which the rain view may be observed by a user. In this embodiment, the display module 160 may be disposed at the upper body 120.

When the air humidification module 200 is placed on the visual body 210, an outer surface of the visual body 210 is closely adhered to the display module 160. At least a portion of the surface of the display module 160 may be formed of or coated with a light-reflective material.

The droplets formed on the visual body 210 may also be projected onto the surface of the display module 160. Accordingly, a user may observe motion of droplets at both the visual body 210 and the display module 160.

The water tank 300 may have the air humidification inlet 31 through which air passes. The air humidification inlet 31 may be provided between the connection passage 103 and a humidification passage 106. The air humidification inlet 31 may be an outlet of the connection passage 103 and an inlet of the humidification passage 106.

The filtered air, supplied from the air cleaning module 100, may flow into the air humidification module 200 (water tank in this embodiment) through the air humidification inlet 31. The humidification medium 50 may be disposed at the air humidification inlet 31 and may cover the air humidification inlet 31.

The humidification medium 50 may be disposed at least one of the following positions: on a same plane as the air humidification inlet 31, or on the outside or the inside of the air humidification inlet 31. The humidification medium 50 is wetted with water for humidification, such that the humidification medium 50 is desirably disposed inside the air humidification inlet 31. That is, the humidification medium 50 is desirably disposed on the inside of the water tank 300.

Water flowing down after wetting the humidification medium 50 is stored in the water tank 300. The humidification medium 50 humidifies the filtered air passing through the air humidification inlet 31.

The filtered air is humidified by water naturally evaporated from the humidification medium 50. The term "natural evaporation" means that water evaporates in a state in which separate heat is not applied to the water. Natural evaporation may be promoted as contact with air increases, a flow velocity of air increases, and a pressure in the air decreases. Natural evaporation may also be referred to as "natural vaporization".

The humidification medium 50 may promote the natural evaporation of water. In this embodiment, the humidification medium 50 is wetted with water but is not immersed in the water tank 300.

The humidification medium 50 may be spaced apart from the water stored in the water tank 300, such that even when water is stored in the water tank 300, the humidification medium 50 is not always in a wet state. That is, the humidification medium 50 may be in a wet state only during operation of a humidification mode, and during operation of an air cleaning mode, the humidification medium 50 may be maintained in a dry state.

The humidification medium 50 may cover the air humidification inlet 31, and the filtered air may pass through the humidification medium 50 to flow into the water tank 300. As the filtered air passes through the air humidification inlet 31, an air flow length may be minimized.

Figure 4:
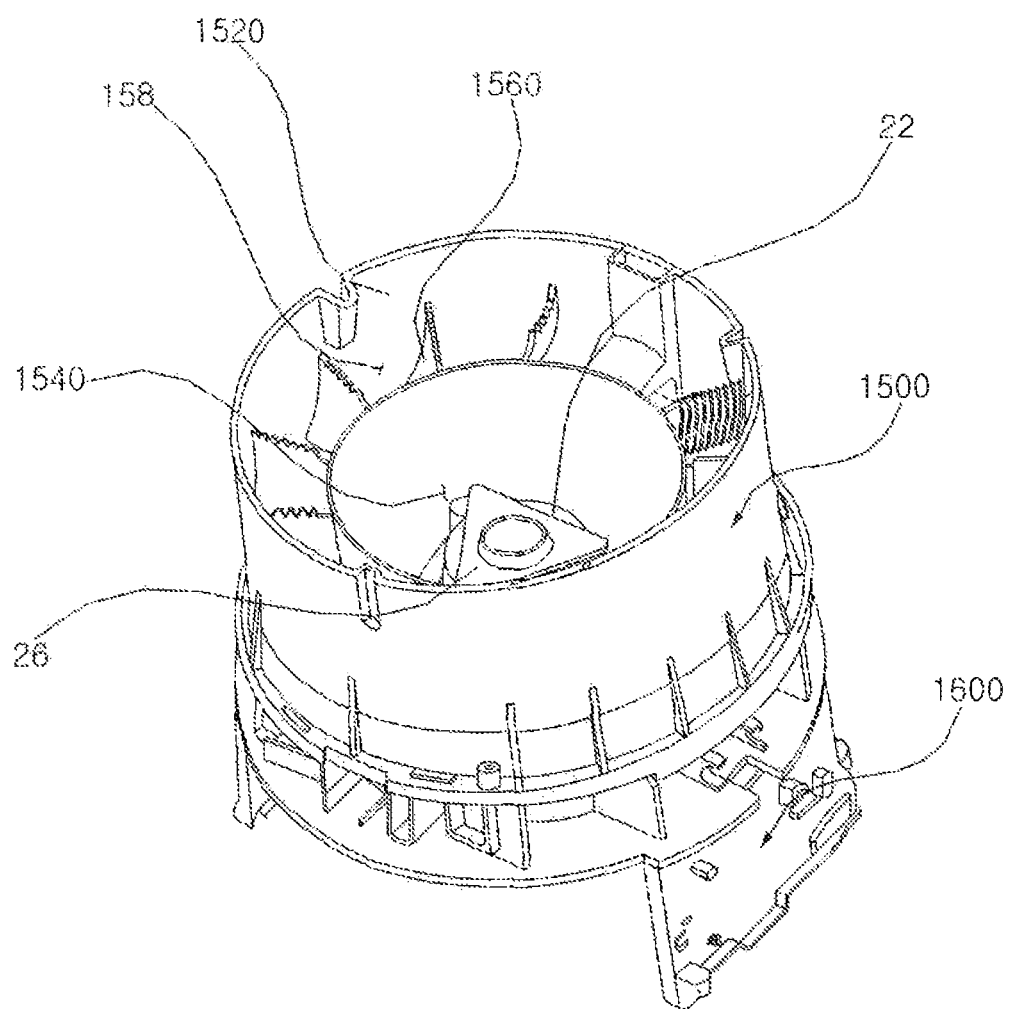
FIG. 4 is an assembled perspective view of a blower housing and a filter housing disposed in a base body of FIG. 1.
Figure 5:
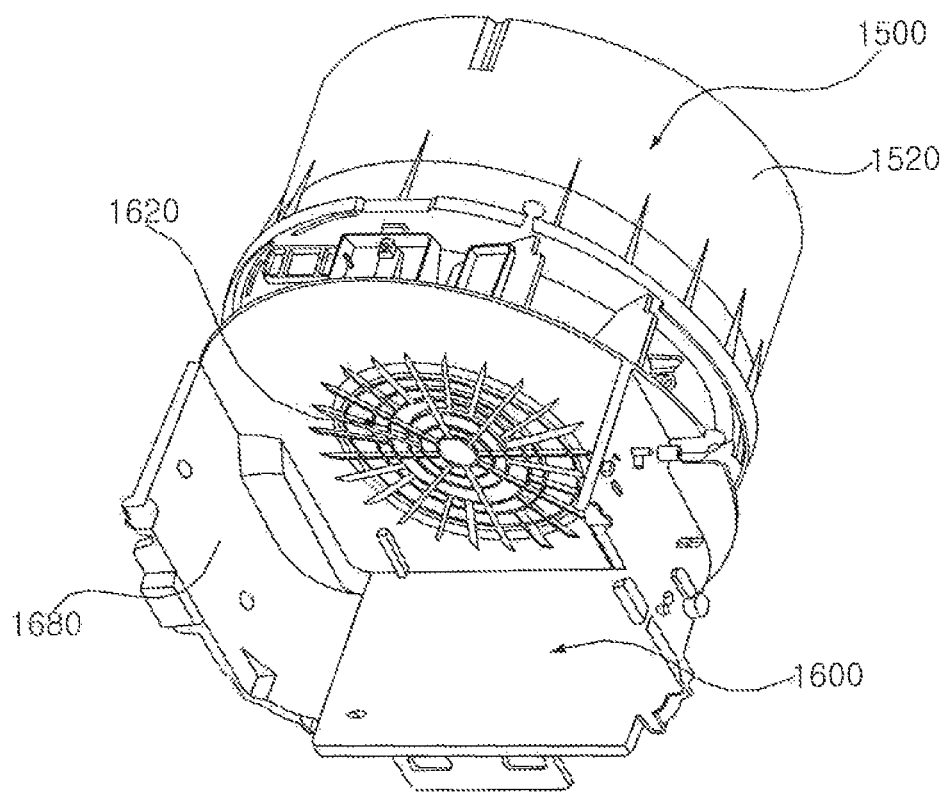
FIG. 5 is a perspective view as seen from a bottom of the blower housing and filter housing of FIG. 4.
Figure 6:
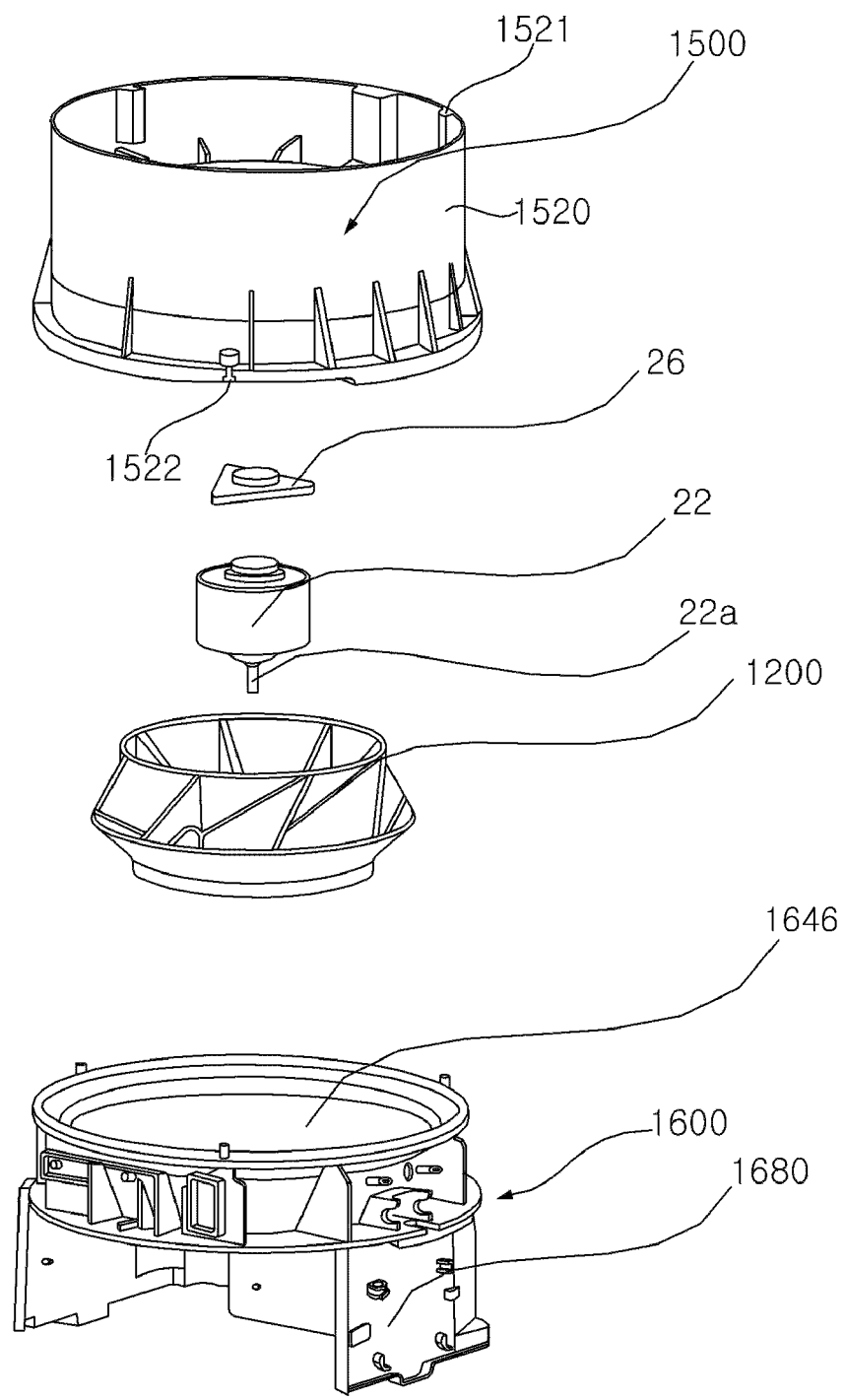
FIG. 6 is an exploded perspective view of the blower housing and filter housing of FIG. 4.

FIG. 4 is an assembled perspective view of a blower housing and a filter housing being disposed in a base body of FIG. 1. FIG. 5 is a perspective view as seen from a bottom of the blower housing and filter housing of FIG. 4. FIG. 6 is an exploded perspective view of the blower housing and filter housing of FIG. 4.

An air conditioner according to an embodiment may include the blower housing 1500 having the blower motor 22 coupled thereto, and an annular air flow passage 158 through which air discharged from the blower fan 24 flows; and filter housing 1600 which may be coupled to the blower housing 1500 and into which a lower portion of the blower fan 24 is inserted. The filter housing 1600 may be disposed inside of the lower body 130. The filter housing 1600 may be coupled to an upper side of the base 112. The filter housing 1600 may be coupled to a lower side of the blower housing 1500. The filter housing 1600 may have the filter assembly 10 inserted therein and guide air, having passed through the filter assembly 10, to the blower fan 24.

The filter housing 1600 may include a filter mounting part or portion (mount) 1680 which may be disposed at a lower side thereof and into which the filter assembly 10 may be detachably inserted; and a flow guide 1646 which is disposed at an upper side thereof and in which a lower portion of the blower fan 24 is received. The filter housing 1600 may have a circular inlet 1620 through which air, purified by passing through the filter assembly 10 disposed between the filter mounting portion 1680 and the flow guide 1646, flows to the blower fan 24. The filter housing 1600 may have a grille formed in a radial shape on the inlet 1620.

The blower housing 1500 may be disposed inside of the lower body 130. The blower housing 1500 may be coupled to an upper side of the filter housing 1600. Further, the blower housing 1500 may be disposed at a lower side of the upper inner body 140 and be coupled to the lower side of the upper body 120. The blower housing 1500 may support the blower motor 22 and guide air, discharged from the blower fan 24, to the upper body 120.

The blower housing 1500 may include an outer housing 1520 forming an exterior thereof and having a cylindrical shape; and an inner housing 1540 disposed at a center portion of the outer housing 1520, and having a bowl shape and the blower motor 22 inserted therein. The blower housing 1500 may have the annular air flow passage 158, which may be formed between the outer housing 1520 and the inner housing 1540, and through which air discharged from the blower fan 24 may flow. The blower housing 1500 may include a plurality of diffuser blades 1560 being spaced apart from each other in a circumferential direction on the air flow passage 158.

The blower unit 20 may include a motor coupling part or portion 26 disposed at an upper side of the blower motor 22 and coupled to the inner housing 1540 to connect the blower motor 22 to the inner housing 1540. The blower motor 22 generates torque to rotate the blower fan 24. The blower motor 22 may be disposed in the inner housing 1540 of the blower housing 1500. The blower motor 22 may be connected to the inner housing 1540 of the blower housing 1500 by the motor coupling portion 26. The blower motor 22 has a rotational shaft 22a which rotational with the torque. The rotational shaft 22a of the blower motor 22 may pass through a center of a lower end of the inner housing 1540 to be coupled to the blower fan 24.

The blower fan 24 may be rotated by the blower motor 22 to blow air. The blower fan 24 allows air, introduced into the inlet 1620 of the filter housing 1600, to flow to be discharged through the air flow passage 158. In this embodiment, the blower fan 24 rotates in a clockwise direction, when viewed from the top.

The blower fan 24 may be a centrifugal fan which draws in air in a direction of the rotational shaft and discharges the air in the radial direction. Compared to other types of fans, the centrifugal fan may maximize air volume when a rotational speed and size are the same, and air may be discharged through the annular air flow passage 158. In this embodiment, however, the blower fan 24 is a centrifugal fan modified such that air is discharged in an upwardly inclined direction.

The blower fan 24 may be disposed below the blower motor 22. An upper portion of the blower fan 24 may be disposed on the outside of the inner housing 1540 of the blower housing 1500. That is, a lower portion of the inner housing 1540 may be inserted into the upper portion of the blower fan 24. A lower portion of the blower fan 24 may be inserted into the flow guide 1646 of the filter housing 1600. A lower end of the blower fan 24 may be disposed adjacent to the inlet 1620 of the filter housing 1600. The rotational shaft 22a of the blower motor 22 may be coupled to the center of the blower fan 24.

Figure 7:
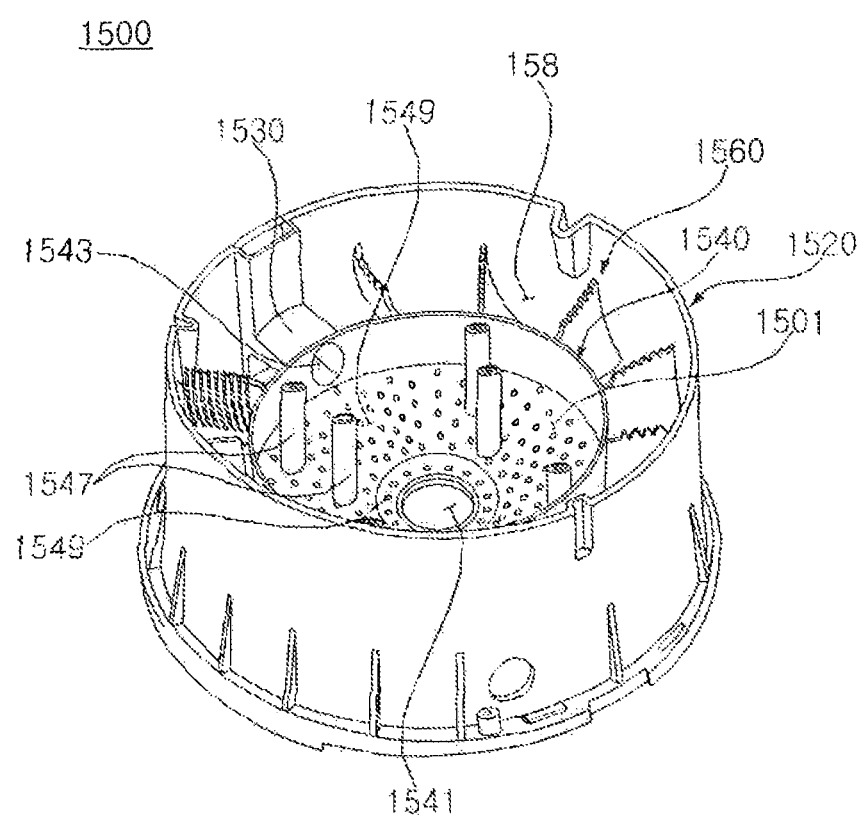
FIG. 7 is a perspective view of the blower housing of FIG. 4.
Figure 8:
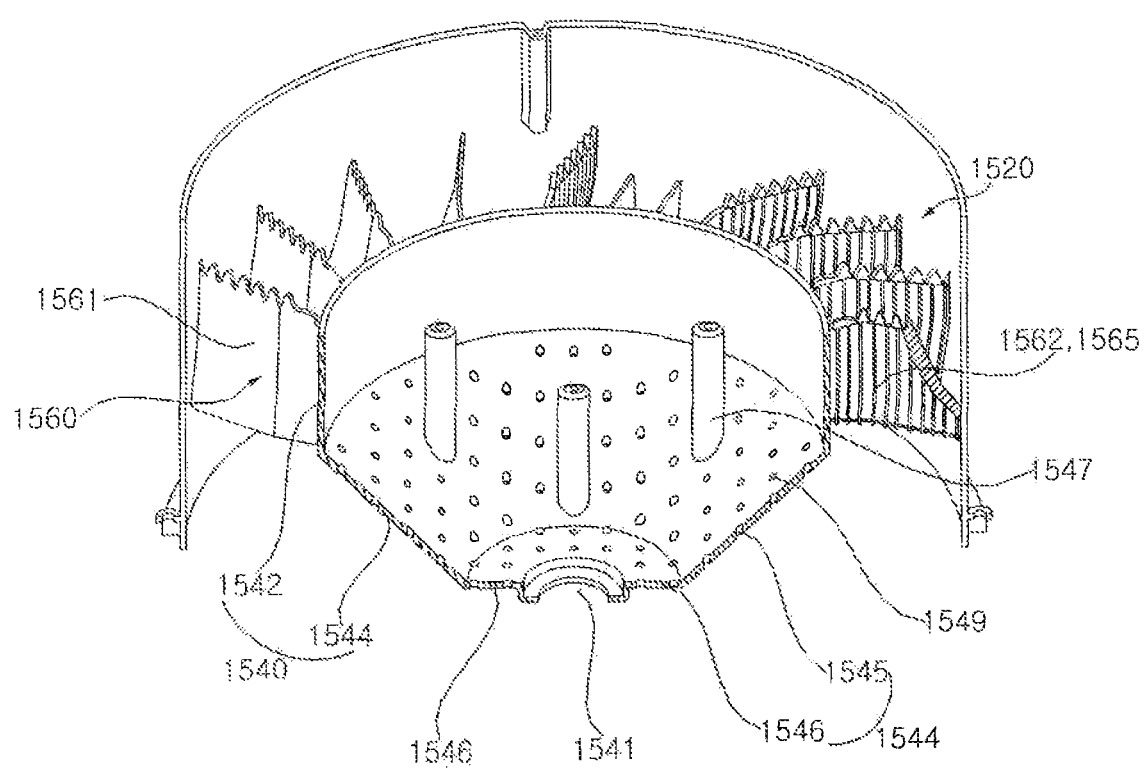
FIG. 8 is a partial cross-sectional perspective view of the blower housing of FIG. 7.
Figure 9:
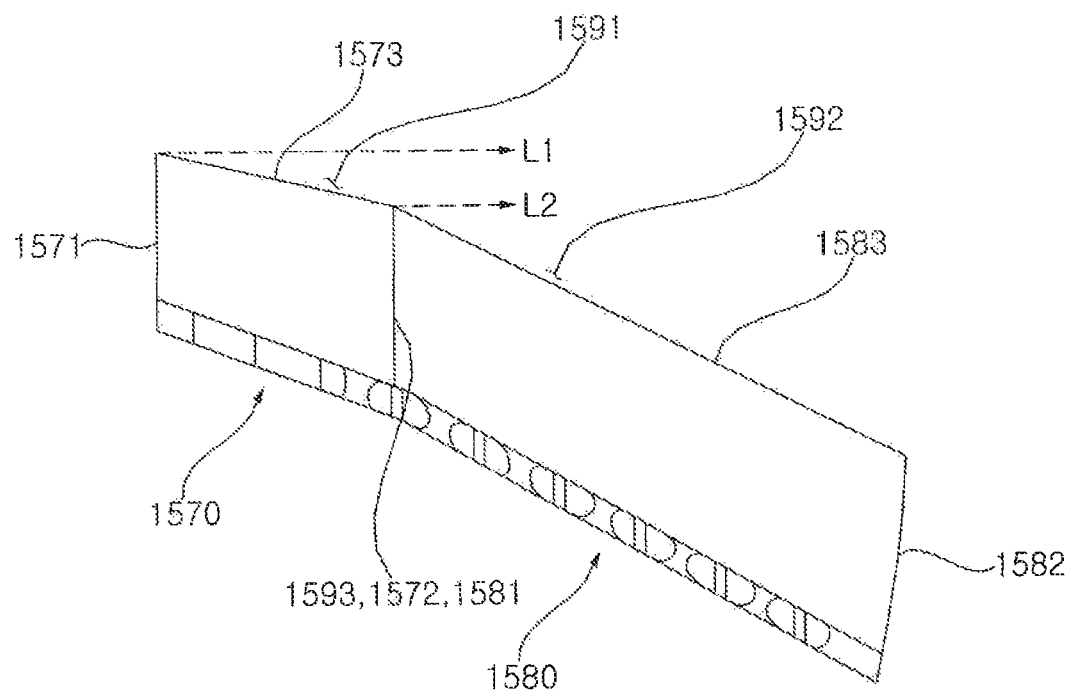
FIG. 9 is a plan view of diffuser blades of FIG. 7.
Figure 10:
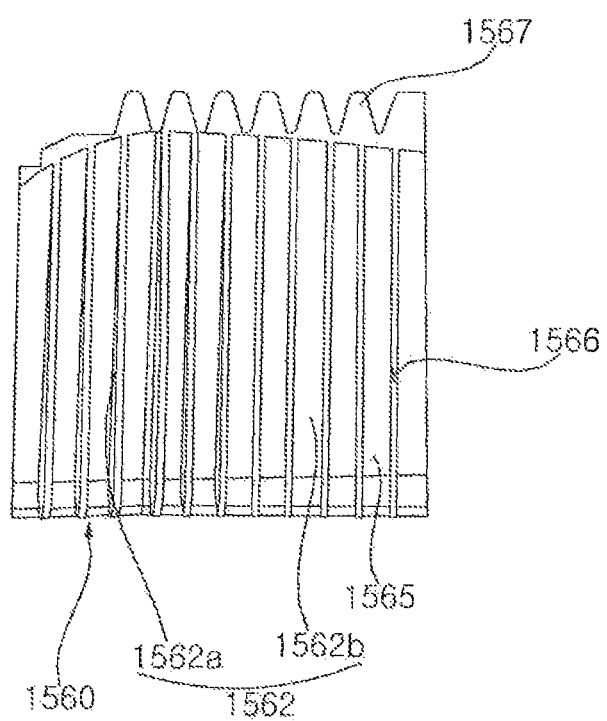
FIG. 10 is a front view of diffuser blades of FIG. 7.

FIG. 7 is a perspective view of the blower housing of FIG. 4. FIG. 8 is a partial cross-sectional perspective view of the blower housing of FIG. 7. FIG. 9 is a plan view of diffuser blades of FIG. 7. FIG. 10 is a front view of diffuser blades of FIG. 7.

The outer housing 1520 may be formed in a cylindrical shape and have an upper part or portion and a lower part or portion which are open. A lower end 1522 of the outer housing 1520 may be assembled to the filter housing 1600, and an upper end 1521 of the outer housing 1520 may be assembled to the upper body 120.

The air flow passage 158 may be formed on the inside of the outer housing 1520. The inner housing 1540 may be formed inside of the outer housing 1520. An outer surface of the inner housing 1540 may be spaced apart from an inner surface of the outer housing 1520, and the inner housing 1540 and the outer housing 1520 may be connected by the plurality of diffuser blades 1560.

An overall shape of the inner housing 1540 may be a bowl shape with an open upper side. The inner housing 1540 may include a side cover 1542 disposed to face the outer housing 1520, and having an upper side and a lower side which are open; a bottom cover 1544 connected to a lower end of the side cover 1542 and having a bowl shape with an open upper side; and a shaft hole 1541 through which the rotational shaft 22a of the blower motor 22 may vertically pass. In this embodiment, the side cover 1542 is formed in a cylindrical shape, and is parallel to the outer housing 1520.

An upper end and a lower end of the side cover 1542 are located within a height of the outer housing 1520. The side cover 1542 may be disposed vertically.

A cable bridge 1530 may be disposed between the side cover 1542 and the outer housing 1520. A cable (not shown) may be disposed inside of the cable bridge 1530 and connected to the air blower unit 20. A hole 1543 that penetrates from an inside to an outside of the side cover 1542 may be formed, and the cable may be inserted through the hole 1543.

As the cable bridge 1530 is disposed across the air flow passage 158, air resistance may be generated. In order to minimize the air resistance, a lower surface of the cable bridge 1530 may have a rounded shape. In this embodiment, the cable bridge 1530 is formed in a semi-cylindrical shape which is downwardly convex.

The bottom cover 1544 may include an inclined cover 1545 having an upper end being connected to the lower end of the side cover 1542 and a lower end being inclined downwardly toward the rotational shaft 22a; and a flat cover 1546 lying flat at the lower end of the inclined cover 1545. The inclined cover 1545 may have a hopper shape with a cross-sectional area decreasing toward the lower side thereof. In this embodiment, the shaft hole 1541 is formed to pass through the inclined cover 1545 in the vertical direction.

The shaft hole 1541 may be formed at an axial center of the inner housing 1540 and the outer housing 1520. The shaft hole 1541 may be closed when the blower motor 22 is assembled.

An outer surface of the inner housing 1540 comes into contact with air, and the blower motor 22 is installed inside of the inner housing 1540. The blower fan 24 may be disposed below the blower motor 22, and the blower fan 24 causes air to flow upward from the lower side.

Accordingly, as a lower surface of the inclined cover 1545 and a lower surface of the flat cover 1546 come into contact with air, it is desirable to minimize bending of the surfaces. The inclined cover 1545 may form an angle of inclination toward the rotational shaft 22a and be formed with a smooth curved surface.

A space formed inside of the inner housing 1540 may be defined as a motor installation space 1501. The blower motor 22 may be disposed in the motor installation space 1501, such that direct contact with the flowing air is prevented.

Bosses 1547 may be disposed in the inner housing 1540 to fix the blower motor 22. In this embodiment, the bosses 1547 are disposed at the bottom cover 1544.

A plurality of bosses 1547 may be provided, some of which may be coupled to the upper inner body 140 and support the upper body 120, and the rest of the bosses 1547 may be used to assemble the blower motor 22.

More specifically, the bosses 1547 may protrude upward from an upper surface of the inclined cover 1545. In this embodiment, the bosses 1547 are assembled with the motor coupling portion 26 by a coupling member (not shown).

A plurality of holes 1549 may be formed which pass through the bottom cover 1544 in the vertical direction. The holes 1549 allow a lower side and the inside of the inner housing 1540 to communicate with each other, such that a portion of air flowing during operation of the blower fan 24 may flow into the motor installation space 1501. The air flowing into the motor installation space 1501 through the holes 1549 may cool the blower motor 22. In addition, water introduced into the motor installation space 1501 may be drained downwardly through the holes 1549.

Under normal conditions, water in the water tank 300 does not flow into the base body 110. However, when the water tank 300 is separated or replaced, water may be stored in the water tank insertion space 125 of the upper inner body 140. In general cases, water stored in the water tank insertion space 125 is not drained downwardly, but there is a possibility that the stored water may leak downwardly through a crack occurring in the upper inner body 140 or through a coupling hole, for example.

Accordingly, water leaking downwardly from the upper inner body 140 may fall down to the blower housing 1500, and the leaking water may be drained through the holes 1549 toward the filter housing 1600. The filter housing 1600 has a flow passage for draining water, flowing downward, to the outside by self-weight.

Further, the diffuser blades 1560 connect the outer housing 1520 and the inner housing 1540. An inner end of the diffuser blade 1560 may be coupled to the outer surface of the inner housing 1540, and an outer end of the diffuser blade 1560 may be coupled to the inner surface of the outer housing 1520.

An arrangement direction of the plurality of diffuser blades 1560 is related to a rotational direction of the blower fan 24. When viewed from the top, the blower fan 24 rotates in a clockwise direction, such that the diffuser blades 1560 are arranged in a clockwise direction. More specifically, the inner end of the diffuser blade 1560 is coupled to the side cover 1542.

When viewed from the top, the plurality of diffuser blades 1560 are disposed radially about the rotational axis 22a. When viewed from the top, the diffuser blades 1560 may be disposed radially about the shaft hole 1541.

The diffuser blades 1560 may be disposed above the bottom cover 1544. Air, guided upward along the lower surface of the bottom cover 1544, may be guided through the diffuser blades 1560.

When viewed from the top, the side cover 1542 may be formed in a circular shape, such that the outer surface of the side cover 1542 and the inner end of the diffuser blades 1560 form a first sweep angle. When viewed from the top, the outer housing 1520 may be formed in a circular shape, such that the inner surface of the outer housing 1520 and the outer end of the diffuser blade 1560 form a second sweep angle.

When the diffuser blade 1560 is cut longitudinally, a longitudinal section of the diffuser blade 1560 may be formed in a shape of an airfoil in a direction from the lower side to the upper side. A surface in a direction in which air flows from the diffuser blades 1560 may be defined as a constant-pressure surface 1561, and an opposite surface to the constant-pressure surface 1561 may be defined as a suction surface 1562. In this embodiment, a plurality of ribs 1565 may be further formed on the suction surface 1562 of the diffuser blades 1560.

The plurality of ribs 1565 may protrude from the suction surface 1562 of the diffuser blades 1560 and extend in a longitudinal direction of the diffuser blades 1560. The ribs 1565 may extend in an air flow direction.

Each of the plurality of ribs 1565 may be formed in the shape of an airfoil, in which a height of a cross-section decreases from a front end (lower side) toward a rear end (upper side). Each of the plurality of ribs 1565 may have a convex shape in a bent direction of the suction surface 1562. The plurality of ribs 1565 may have formed on the suction surface 1562 and suppress formation of a vortex on the suction surface 1562 of the diffuser blades 1560. Grooves 1566, having a smaller width than that of the ribs 1565, may be formed between the respective ribs 1565. In addition, the upper end of each of the plurality of diffuser blades 1560 may be formed in the shape of a saw tooth 1567.

The diffuser blades 1560 may include a first blade 1570 having an inner end coupled to the inner housing 1540, and a second blade 1580 having an outer end coupled to the outer housing 1520 and an inner end coupled to the first blade 1570. When cut longitudinally, the first blade 1570 and the second blade 1580 may be formed in a shape of an airfoil in a direction from a lower side to an upper side.

The first blade 1570 and the second blade 1580 may be integrally formed with each other. The ribs 1565 and the grooves 1567 may be formed on the respective suction surfaces 1562a and 1562b of the first blade 1570 and the second blade 1580.

The inner end of the first blade 1570 may be coupled to the outer surface of the inner housing 1540, and the outer end of the first blade 1570 may be coupled to the inner end of the second blade 1580. The inner end of the second blade 1580 may be coupled to the outer end of the first blade 1570, and the outer end of the second blade 1580 may be coupled to the inner surface of the outer housing 1520.

When viewed from the top, the first blade 1570 and the second blade 1580 are disposed such that the constant-pressure surface 1561 thereof is viewed more, and the suction surface 1562 is inclined downwardly.

The first blade 1570 and the inner housing 1540 form a first sweep angle 1591, and the first blade 1570 and the second blade 1580 form a second sweep angle 1592. The first blade 1570 and the second blade 1580 form an included angle. The included angle may be greater than 90 degrees and less than 180 degrees.

More particularly, when viewed from the top, the first blade 1570 and the second blade 1580 form the included angle, which is an angle obtained by subtracting the first sweep angle from the second sweep angle ("second sweep angle–first sweep angle"). More specifically, the front end 1573 of the first blade 1570 and the front end 1583 of the second blade 1580 may form the included angle. That is, rather than forming a continuous plane or a curved surface, the first blade 1570 and the second blade 1580 according to this embodiment have a bent portion formed in the middle.

When viewed from the top, an angle, formed between a virtual normal line L1 with respect to the rotational shaft 22*a* or a virtual normal line L1 with respect to a plane center of the blower housing 1500 and the edge of the first blade 1570, may be defined as the first sweep angle 1591. Further, when viewed from the top, an angle formed between the normal line L1 and the edge of a second blade 1580 is defined as the second sweep angle 1592.

More specifically, the first sweep angle 1591 is the included angle between the front end 1573 of the first blade 1570 and the normal line L1. The front end 1573 is the edge first coming into contact with the discharged air, and is the lower end of the first blade 1570 in this embodiment. Likewise, the second sweep angle 1592 is the included angle between the front end 1583 of the second blade 1580 and the normal line L1. The front end 1583 is the edge first coming into contact with the discharged air, and is the lower end of the second blade 1580 in this embodiment.

If it is necessary to distinguish between the front ends, the front end of the first blade 1570 is defined as the first front end 1573, and the front end of the second blade 1580 is defined as the second front end 1583.

The first sweep angle 1591 rotates about the normal line L1 in the same direction as the rotational direction of the blower fan. The second sweep angle 1592 rotates further than the first sweep angle 1591 in the rotational direction of the blower fan.

When viewed from the top, the first front end 1573 is disposed closer to the normal line L1 than the second front end 1583. The second sweep angle 1592 is greater than the first sweep angle 1591. The second sweep angle 1592 may be two to four times greater than the first sweep angle 1591.

In this embodiment, the diffuser blades 1560 form dual sweep angles, thereby reducing noise caused by the discharged air, and reducing power consumption. As the diffuser blades 1560 form dual sweep angles, a phase difference is formed in the discharged air while the air passes through the diffuser blades 1560, and the phase difference in the discharged air may reduce peak noise occurring due to specific overlapping frequencies.

More particularly, it is desirable to reduce collision of air with the diffuser blades 1560 on the radially outer side where the air flows at a high speed. In this embodiment, by forming a greater second sweep angle 1592 of the second blade 1580, the collision with the discharged air may be reduced more effectively.

The second sweep angle 1592 is formed at a connection portion between the first blade 1570 and the second blade 1580 of the diffuser blades 1560. The connection portion, at which the first sweep angle 1591 changes to the second sweep angle 1592, between the first blade 1570 and the second blade 1580 is defined as the change portion (t) 1593.

Figure 11:
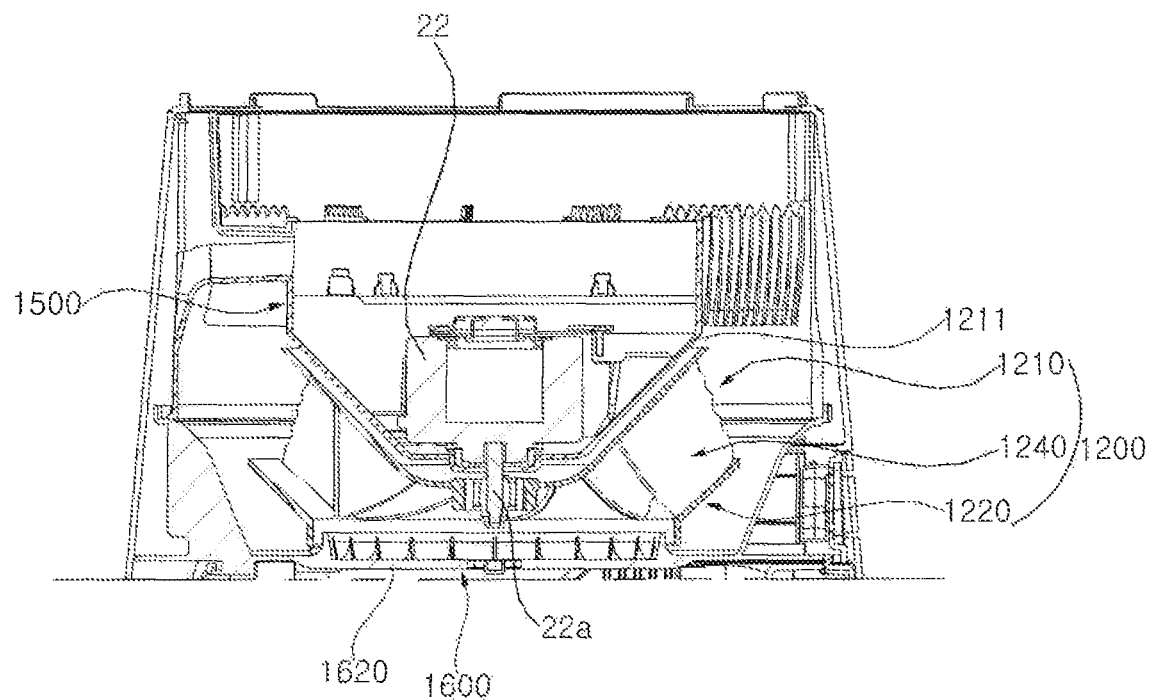
FIG. 11 is an enlarged cross-sectional view of an air blower unit of FIG. 3.
Figure 12:
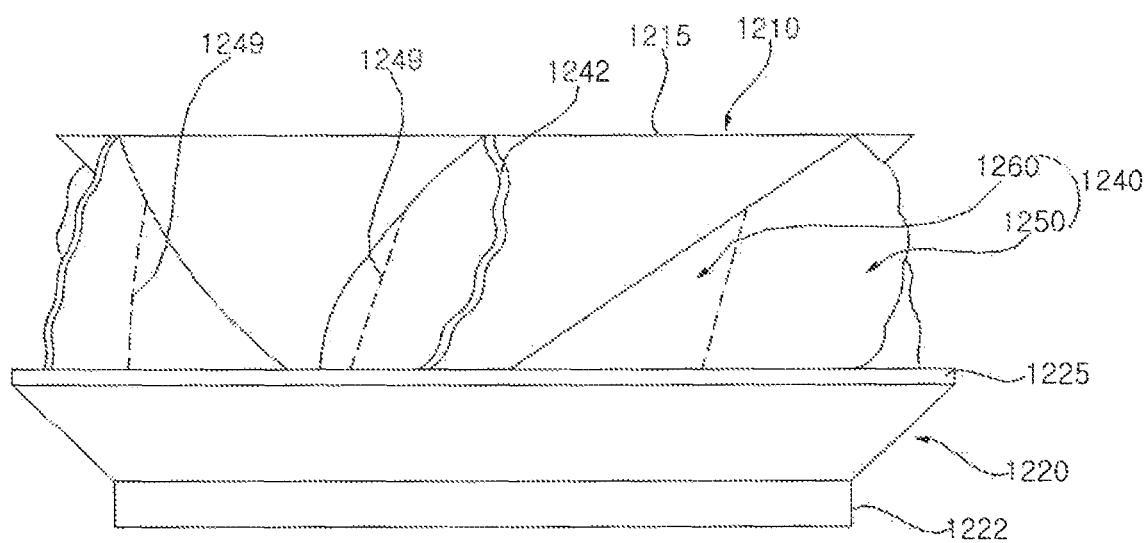
FIG. 12 is a front view of a blower fan of FIG. 11.
Figure 13:
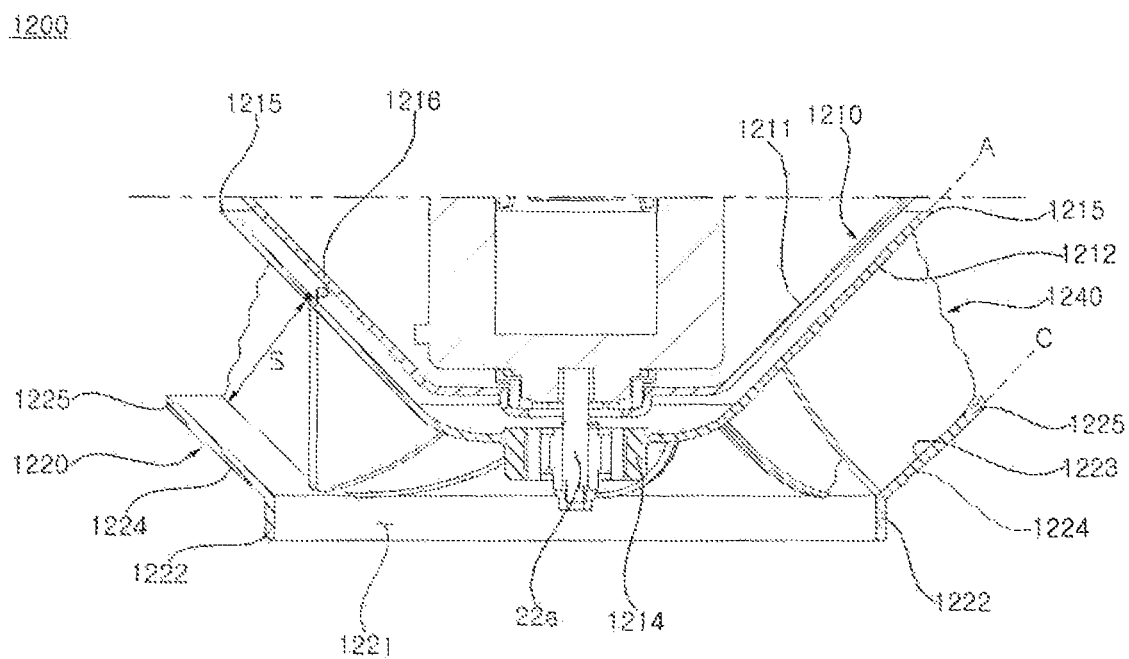
FIG. 13 is a cross-sectional view of the blower fan of FIG. 12.
Figure 14:
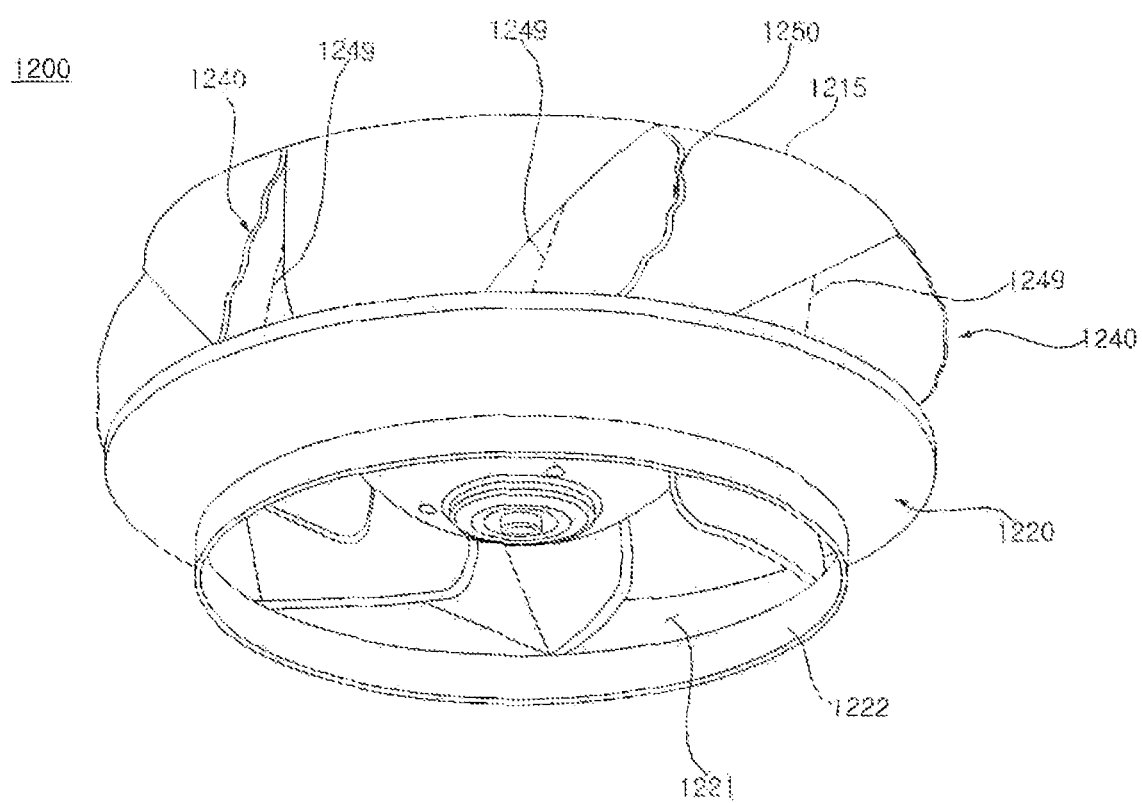
FIG. 14 is a bottom perspective view of a blower fan of FIG. 6.
Figure 15:
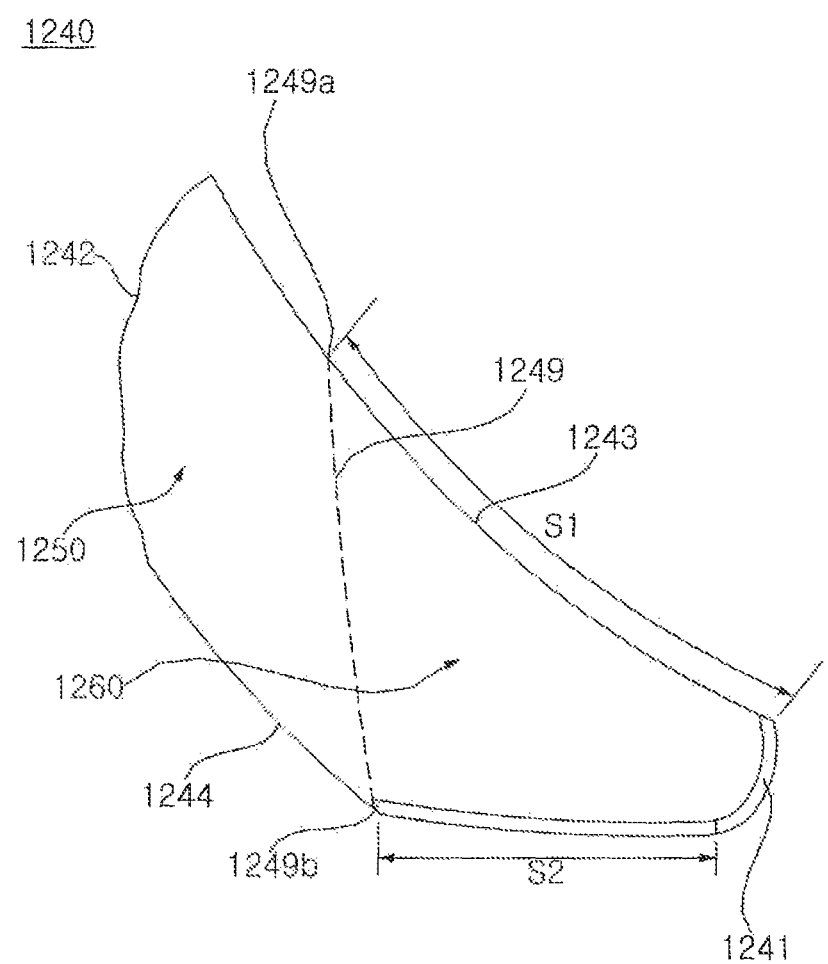
FIG. 15 is a front view of a blade of FIG. 15.
Figure 16:
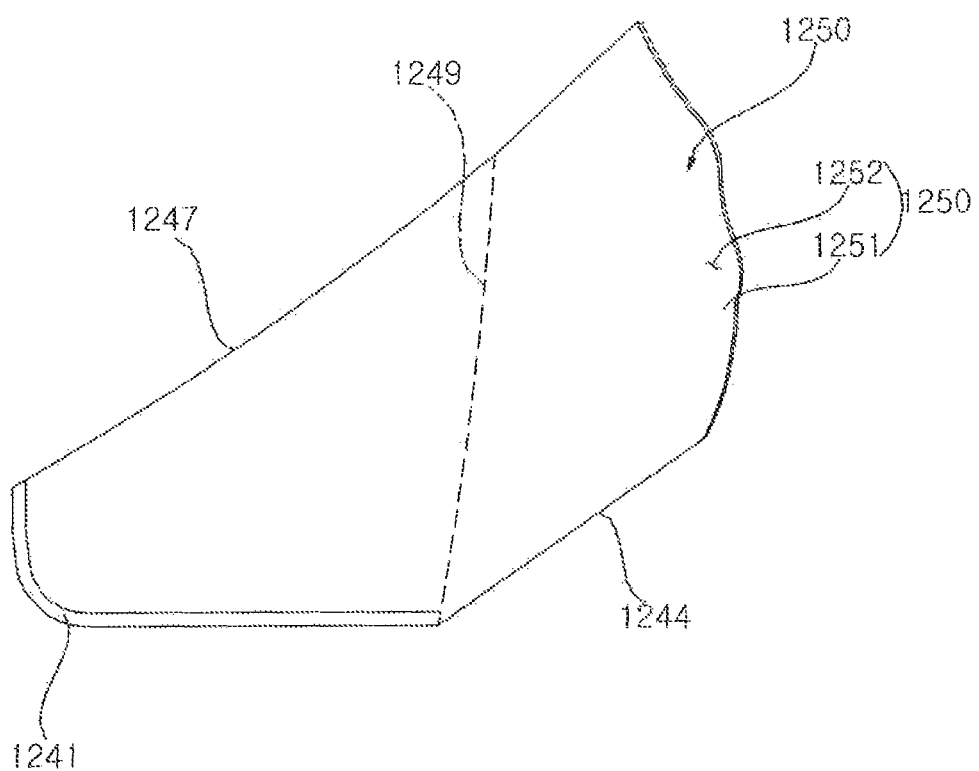
FIG. 16 is a front view of the blade of FIG. 15.
Figure 17:
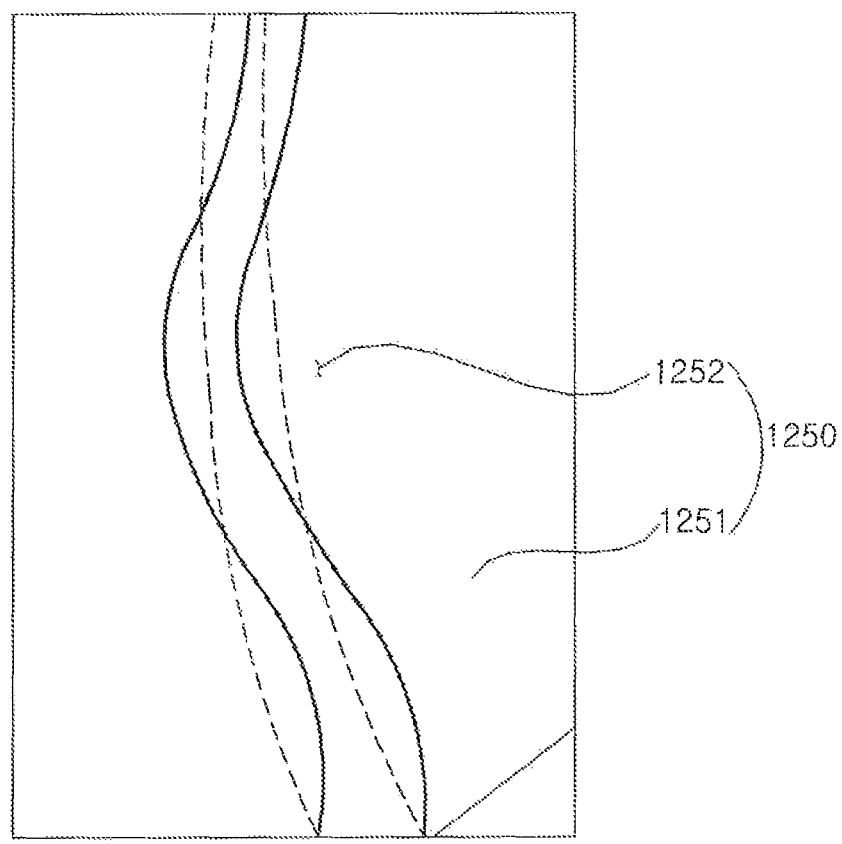
FIG. 17 is a side view of the blade of FIG. 15.

FIG. 11 is an enlarged cross-sectional view of an air blower unit of FIG. 3. FIG. 12 is a front view of a blower fan of FIG. 11. FIG. 13 is a cross-sectional view of the blower fan of FIG. 12. FIG. 14 is a bottom perspective view of a blower fan of FIG. 6. FIG. 15 is a front view of a blade of FIG. 15. FIG. 16 is a front view of the blade of FIG. 15, and FIG. 17 is a side view of the blade of FIG. 15.

The blower fan 1200 may include a hub 1210 to which rotational shaft 22*a* is coupled; a shroud 1220 spaced apart from the hub 1210 and having a suction port 1221 formed at a center, through which air is drawn; and a plurality of blades 1240 disposed between the hub 1210 and the shroud 1220 and coupled to the hub 1210 and the shroud 1220.

The blower motor 22 may be disposed above the hub 1210. The inner housing 1540 may be disposed between the blower motor 22 and the hub 1210. The rotational shaft 22*a* of the blower motor 22 may pass through the inner housing 1540 to be coupled to the hub 1210.

When viewed from the top, the rotational shaft 22 is coupled to a center of the hub 1210. The hub 1210 may be formed in the shape of a cone or bowl protruding downwardly further from the center of the hub 1210.

The hub 1210 may be disposed below the inner housing 1540. An upper surface of 1211 of the hub 1210 may be spaced apart from a lower surface of the inner housing 1540. The upper surface 1211 of the hub 1210 may face the lower surface of the inner housing 1540.

The inner housing 1540 may be inserted into a concave upper part or portion of the hub 1210, and at least a portion of the blower motor 22 may be located within a height of the hub 1210. In this structure, a height of the blower motor 22 and the blower fan 1200 may be minimized.

The hub 1210 may be disposed above the shroud 1220 and may be spaced apart from the shroud 1220. The plurality of blades 1240 may be coupled to a lower surface of the hub 1210.

The hub 1210 may be formed in the shape of a cone or bowl protruding downwardly further from the center, such that an outside border 1215 is inclined upwardly. The outside border 1215 of the hub 1210 may be directed toward the diffuser blade 1560 of the blower housing 1500. In this embodiment, the outside border 1215 of the hub 1210 forms an upper end of the hub 1210.

A direction, in which the outside border 1215 of the hub 1210 is directed, may be inclined upward at an angle of about 45 degrees with respect to a horizontal plane. The hub 1210 guides air upwardly in a circumferential direction.

The hub 1210 may include a shaft coupling part or portion 1214, to which the rotational shaft 22*a* is coupled, and a hub guide 1216 which obliquely extends radially outwardly and upwardly relative to the shaft coupling portion 1214.

The rotational shaft 22*a* may be coupled to the shaft coupling portion 1214, and the blade 1240 may be coupled to the hub guide 1216. Air is guided along the lower surface 1212 of the hub guide 1216, and the upper surface 1211 of the hub guide 1216 faces the inner housing 1540.

At least a portion of the hub guide 1216 may be inclined upward up to the outside border 1215. In this embodiment, the direction in which the outside border 1215 is directed is defined as an inclined straight-line A.

In a longitudinal section of the hub 1210, the inclined straight-line A may be formed from portions, to which each of leading edges 1241 is coupled, up to the outside border 1215. Further, the hub 1210 may have a diameter which increases from the portions, to which each of the leading edges 1241 is coupled, up to the outside border 1215.

The shroud 1220 draws in air through the center portion, and guides air radially outwardly. The circular suction port 1221, through which air is drawn, may be formed at a lower center portion of the shroud 1220.

The shroud 1220 has an upper portion and a lower portion which are open, and the blade 1240 may be disposed at the upper portion of the shroud 1220.

The suction port 1221 of the shroud 1220 may be disposed at a portion corresponding to an inlet 1620 of the filter housing 1600. That is, the inlet 1620 of the filter housing 1600 may be formed at a portion corresponding to the suction port 1221 of the shroud 1220. A diameter of the suction port 1221 may be greater than that of the inlet 1620. The shroud 1220 may have a suction guide 1222 that protrudes vertically downwardly around a circumference of the suction port 1221.

The shroud 1220 may be disposed at a position spaced apart from the lower portion of the hub 1210. The plurality of blades 1240 may be coupled to the upper surface of the shroud 1220. The inlet 1620 of the filter housing 1600 may be disposed at the lower portion of the shroud 1220. The inlet 1620 and the suction port 1221 face each other.

An outside border 1225 of the shroud 1220 may be directed radially outwardly and upwardly. The outside border 1225 of the shroud 1220 may be inclined upwardly.

The outside border 1225 of the shroud 1220 may form an inclined straight-line C. The outside border 1225 forms an upper circumference of the shroud 1220, and a direction in which the outside border 1225 of the shroud 1220 is directed may be inclined at an angle of about 45 degrees with respect to a horizontal direction. A direction C in which the outside border 1225 of the shroud 1220 is directed may be substantially parallel to the direction A in which the outside border 1215 of the hub 1210 is directed.

In the longitudinal section of the shroud 1220, an inclined straight-line C may be formed from the portions, to which the respective leading edges 1241 of the plurality of blades 1240 are connected, up to an outer circumferential end. The shroud 1220 may have a diameter which increases uniformly from the upper end of the suction guide 1222 to the outside border 1225. The diameter of the shroud 1220 may increase uniformly from the portions, to which the respective leading edges 1241 of the plurality of blades 1240 are connected, up to the outside border 1225.

Depending on embodiments, a distance between the shroud 1220 and the hub 1210 may gradually increase radially outwardly. The diameter of the outside border 1225 of the shroud 1220 may be greater than the diameter of the outside border 1215 of the hub 1210. The outside border 1225 of the shroud 1220 may protrude radially further than the outside border 1215 of the hub 1210.

When a shortest distance between the outside border 1225 of the shroud 1220 and the hub 1210 is defined as a straight line S, and a point at which the straight line S meets the hub 1210 is defined as a point P, the outside border 1215 of the hub 1210 protrudes radially outward further than the point P.

The shroud 1220 may include the suction guide 1222 forming the suction port 1221, and a shroud guide 1225 inclined radially outward from the upper end of the suction port 1222. The suction guide 1222 may be directed toward the inlet 1620, and disposed in an up-down or vertical direction in this embodiment.

The shroud guide 1224 may be inclined upwardly, and an upper end of the shroud guide 1224 may form the outside border 1225. The lower surface of the blade 1240 may be coupled to the upper surface of the shroud guide 1224.

A plurality of blades 1224 may be provided. An upper end of the blade 1240 may be coupled to the lower surface of the hub 1210, and a lower end of the blade 1240 may be coupled to the upper surface of the shroud 1220. In this embodiment, an upper edge 1243 of the blade 1240 may be coupled to the lower surface 1212 of the hub 1210, and a lower edge 1244 of the blade 1240 may be coupled to the upper surface 1223 of the shroud 1220.

The plurality of blades 1240 may be disposed radially about the rotational shaft 22a, and may be arranged in a circumferential direction with respect to the rotational shaft 22a. A vertical cross-section of the blade 1240 may be formed in the shape of an airfoil.

A line connecting a longitudinal direction of the respective blades 1240 may be defined as a span, and a height of the blades 1240, perpendicular to the span, may be defined as a chord. In addition, a portion of the blade 1240, into which air is drawn (inner leading end of the span), may be defined as a leading edge 1241, and a portion of the blade 1240, from which air is discharged (outer leading end of the span), may be defined as a trailing edge 1242. The trailing edge 1242 of the blade 1240 may be inclined with respect to a vertical direction, and allow discharged air to flow upwardly at an incline.

The blades 1240 according to an embodiment may include a first blade 1250 and a second blade 1260. The first blade 1250 may be disposed radially outward from the rotational shaft 22a, and the second blade 1260 may be disposed radially inward from the first blade 1250. A partitioning line 1249 may be formed between the first blade 1250 and the second blade 1260. The first blade 1250 and the second blade 1260 may be integrally formed by injection molding. The partitioning line 1249 is a mark of a molded product, which is formed during injection molding.

The partitioning line 1249 may be formed on each of a suction surface and a constant-pressure surface of the blades 1240. The partitioning line 1249 may be disposed radially outward of the suction guide 1222 with respect to the rotational shaft 22a.

The second blade 1260 may be formed in a flat shape or a smooth curve shape. The first blade 1250 may be formed in the shape of a wave.

The first blade 1250 may have a wave shape, and a cycle or repetitive pattern of the wave intersects a longitudinal direction. As the wave is formed on the first blade 1250, structural rigidity of the blade 1250 may increase. More particularly, a greater pressure may be exerted on the trailing edge 1242 of the first blade 1250, such that the wave having a predetermined cycle or repetitive pattern may produce the effects of reducing noise and increasing rigidity. By increasing the rigidity of the blades 1240, vibrations occurring during rotation may be reduced.

The trailing edge 1242 may be formed at the first blade 1250, and the leading edge 1241 may be formed at the second blade 1260. The first blade 1250 may be elongated in a longitudinal direction of the blade 1240. The first blade 1250 may be formed from the leading edge 1241 of the blade 1240 toward the trailing edge 1242 thereof. The wave of the first blade 1250 may be formed from the upper edge 1243 of the blade 1240 toward the lower edge 1244 thereof. The wave of the first blade 1250 may be formed along the trailing edge 1242.

A starting position of the first blade 1250 may be the leading edge 1242 or a specific position in the chord direction. In this embodiment, the first blade 1250 starts from a middle portion between the leading edge 1241 and the trailing edge 1242, and extends to the trailing edge 1242.

In this embodiment, the starting position of the first blade 1250 may be located outside of the partitioning line. The cycle of the wave of the first blade 1250 may be within a range of 30% to 12% of a height in the span direction. The height in the span direction may be a length of the blade surface connecting the hub 1210 and the shroud 1220. In addition, the blade 1240 may include a plurality of ridges 1251 formed in a region adjacent to the shroud 1220, and valleys 1252 formed between the ridges 1251.

Referring to FIG. 16, an amplitude of the wave of the first blade 1250 may be 0.2 to 2 times a thickness of the blade 1240. In this embodiment, by the amplitude of the wave of the first blade 1250, the first blade 1250 may protrude, by 1 mm, toward the suction surface or the constant-pressure surface of the blade 1240, thereby forming the valleys 1252 and the ridges 1251. More specifically, the ridges 1251 may protrude toward the constant-pressure surface of the blade 1254, and the valleys 1252 may protrude toward the suction surface of the blade 1254.

The ridges 1251 and the valleys 1252 may be formed in a longitudinal direction of the span. The ridges 1251 and the valleys 1252 may be formed at an angle between the straight-line A of the hub 1210 and the straight-line C of the shroud 1220.

The first blade 1250 may start from a middle portion between the leading edge 1241 and the trailing edge 1242, and extend up to the trailing edge 1242, and the ridges 1251 and the valleys 1252 may be formed by the wave form of the first blade 1250. The flow of air to be discharged may be guided by the ridges 1251 and valleys 1252, thereby achieving uniform flow of the discharged air in the span direction.

Further, as the wave of the first blade 1250 is formed at the trailing edge 1242, air separated from the trailing edge 1242 has a phase difference in the air discharge direction. More particularly, when the phase difference is formed for the discharged air at the trailing edge 1242, noise may be reduced.

As one cycle of the wave of the first blade 1250 decreases in magnitude, the number of waves increases, and as one cycle of the wave of the first blade 1250 increases in magnitude, the number of waves decreases. As the number of waves increases, a surface area of the blade 1240 increases, such that air flow resistance increases. By contrast, if the number of waves decreases, a surface area of the blade 1240 decreases, such that air flow resistance may decrease.

That is, the effect of reducing noise by the separation of air may vary according to the cycle or amplitude of the wave. In consideration of the above, the cycle of the wave of the first blade 1250 may be set to be 30% to 12% of the height of the span direction, and the amplitude of the wave of the first blade 1250 may be 0.2 to 2 times the thickness of the blade 1240.

The first blade 1250 may start from a portion corresponding to 50% to 70% of the leading edge 1241 with respect to the span direction, and may extend up to the trailing edge 1242.

A portion where the first blade 1250 is formed in the blade 1240 may be divided by a partitioning line 1249. The first blade 1250 may be disposed in a direction from the partitioning line 1249 to the trailing edge 1242, and the second blade 1260 is formed in a direction from the partitioning line 1249 to the leading edge 1241.

An upper end 1249a of the partitioning line 1249 may be connected to the upper edge 1243 of the blade 1240. A lower end 1249b of the partitioning line 1249 may be connected to the lower edge 1244 of the blade 1240.

The lower end 1249b of the partitioning line 1249 may be connected to the shroud 1220. The lower end 1249b of the partitioning line 1249 may be disposed at an upper portion of the suction guide 1222.

A starting position of the partitioning line 1249 at the upper portion of the blade 1240 may be different from a starting position of the partitioning line 1249 at the lower portion thereof. In this embodiment, a length S1 between the leading edge 1241 and the upper end 1249a of the partitioning line 1249 is greater than a length S2 between the leading edge 1241 and the lower end 1249b of the partitioning line 1249. In this embodiment, the length S1 corresponds to 70% of the span, and the length S2 corresponds to 50% of the span.

During injection molding of the blower fan, molds for forming the first blade 1250 may be inserted or withdrawn in a radial direction with respect to the rotational shaft 22a. Further, molds for forming the second blade 1260 may be inserted or withdrawn in an axial direction with respect to the rotational shaft 22a. That is, a movement direction of a mold, located radially inward from the partitioning line 1249, intersects a movement direction of a mold located radially outward from the partitioning line 1249. More particularly, the molds for forming the second blade 1260 are moved through the suction port 1221, such that the lower end 1249b of the partitioning line 1249 is disposed above the suction guide 1222 or is disposed radially inward of the suction guide 1222. That is, the lower end 1249b of the partitioning line 1249 is required to be arranged in alignment with the suction guide 1222 in a vertical direction, or is required to be disposed adjacent to the rotational shaft 22a.

Figure 18A:
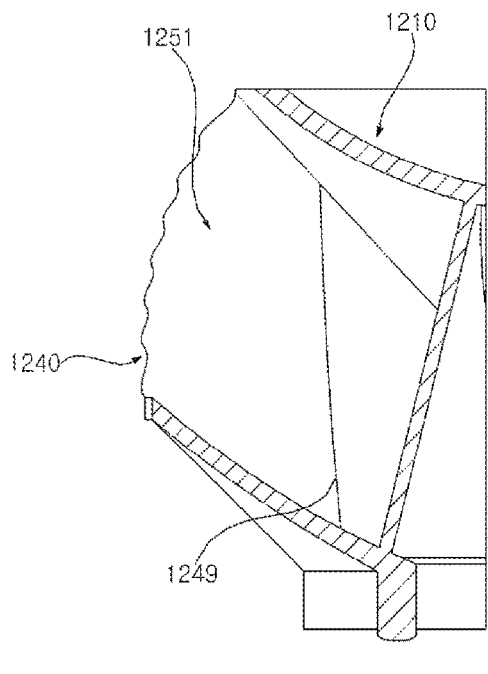
FIGS. 18A-18C are partially enlarged views of a blower fan, illustrating blades according to another embodiment.
Figure 18B:
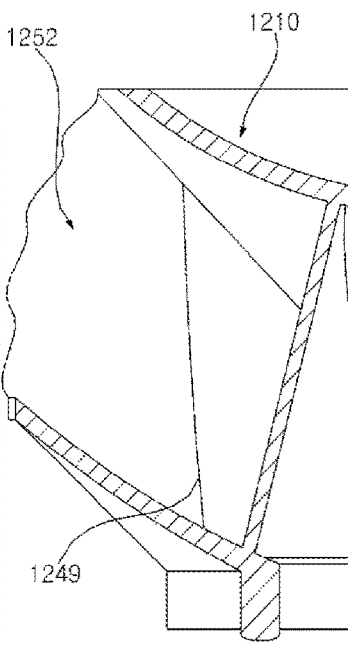
Figure 18C:
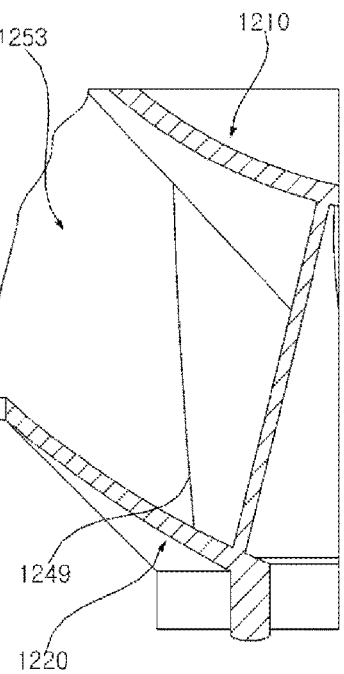

FIGS. 18A-18C are partially enlarged views of a blower fan, illustrating blades according to another embodiment. FIG. 18A illustrates the blade 1240 having a wave 1251 with eight cycles formed outside of the partitioning line 1249; FIG. 18B illustrates the blade 1240 having a wave 1251 with six cycles formed outside of the partitioning line 1249; and FIG. 18C illustrates the blade 1240 having a wave 1251 with four cycles formed outside of the partitioning line 1249.

Figure 19:
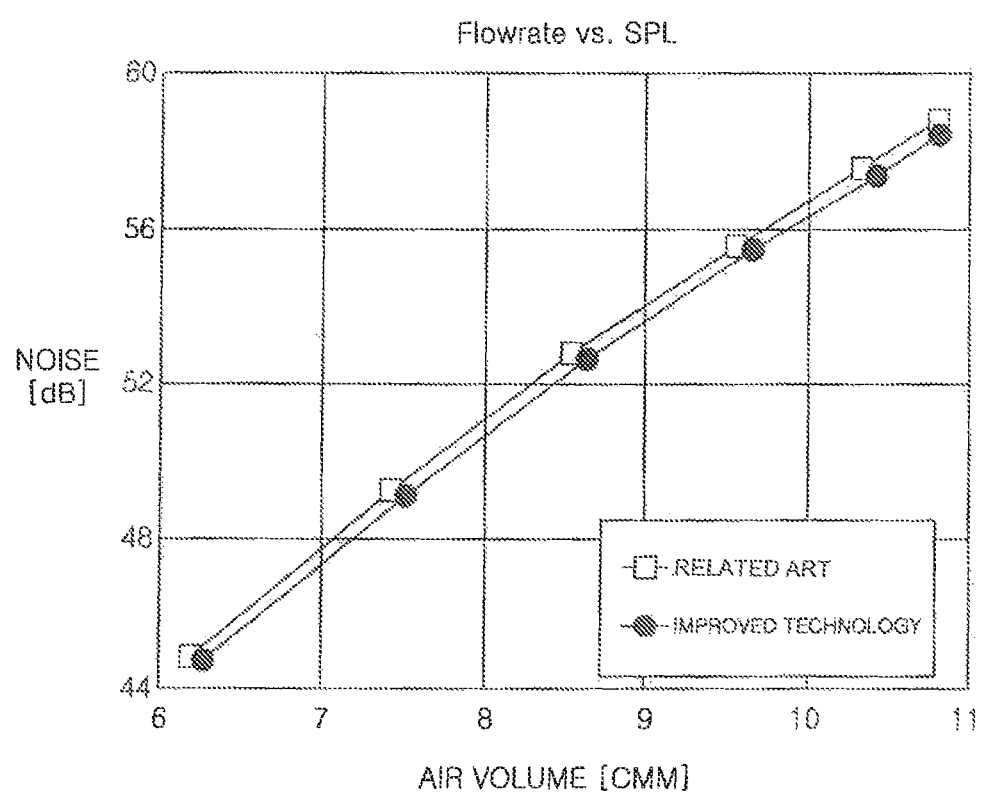
FIG. 19 is a graph of air volume versus noise in a comparison of an embodiment and related art.

FIG. 19 is a diagram illustrating a graph of air volume versus noise in a comparison of an embodiment and a related art. As can be seen in the graph, noise of the blower fan having the first blade 1250 according an embodiment is reduced by 0.4 dB, such that power consumption of a fan motor may also be reduced by 1%.

The humidification and air cleaning apparatus according to embodiments disclosed herein may have at least one or more of the following advantages.

Firstly, in embodiments disclosed herein, a wave having a predetermined cycle is formed on blades of the blower fan, thereby minimizing operating noise caused by a flow of the discharged air of a blower fan. Secondly, in embodiments disclosed herein, a wave is formed at the trailing edge of the blades of the blower fan, such that a phase difference may be formed for air to be separated, such that air flow noise of the discharged air may be reduced. Thirdly, in embodiments disclosed herein, the ridges and the valleys may be formed in the span direction of the blades of the blower fan, such that flow distribution of the discharged air may be improved, and air flow noise may be reduced. Fourthly, in embodiments disclosed herein, a wave is formed radially outward from the parting line, such that the blades may be easily formed by injection molding.

Fifthly, in embodiments disclosed herein, a wave is formed radially outward of the blades, such that structural rigidity of the blades may be increased.

Embodiments disclosed herein provide a humidification and air cleaning apparatus capable of minimizing operating noise caused by a flow of discharged air of a blower fan. Embodiments disclosed herein further provide a humidification and air cleaning apparatus capable of reducing air flow noise by forming a phase difference for air passing through blades of the blower fan. Embodiments disclosed herein furthermore provide a humidification and air cleaning apparatus capable of reducing air flow noise by improving flow distribution of the discharged air separated from the blades of the blower fan.

Embodiments disclosed herein are not limited to the aforementioned advantages and other advantages not described herein will be clearly understood by those skilled in the art from the following description.

In embodiments disclosed herein, a wave having a predetermined cycle may be formed on the blades of the blower fan, thereby minimizing operating noise caused by a flow of discharged air of the blower fan. A wave may be formed at the trailing edge of the blades of the blower fan, such that a phase difference may be formed for air to be separated, such that air flow noise of the discharged air may be reduced. The ridges and the valleys may be formed in a span direction of the blades of the blower fan, such that flow distribution of the discharged air may be improved, and air flow noise may be reduced.

Embodiments disclosed herein provide a humidification and air cleaning apparatus that may include a hub to which a rotational shaft is coupled; a shroud spaced apart from the hub and having a suction port formed at a center, through which air is drawn; and a plurality of blades disposed between the hub and the shroud and coupled to the hub and the shroud. The plurality of blades may have a wave formed in a direction from the shroud toward the hub and formed with ridges and valleys, and having a predetermined cycle. The blades may include a first blade coupled to the hub and the shroud and having a trailing edge, and a second blade coupled to the hub and the shroud, integrally formed with the first blade, and having a leading edge. The wave may be formed on the first blade. The wave may extend to the trailing edge.

The humidification and air cleaning apparatus may further include a partitioning line formed by injection molding and disposed between the first blade and the second blade. The wave may be formed from the partitioning line toward the trailing edge with respect to the rotational shaft. The ridges and the valleys may be elongated from the partitioning line toward the trailing edge. The ridges and the valleys may extend to the trailing edge.

When a line connecting a longitudinal direction of the blades is defined as a span, the ridges and the valleys may be formed along the span. When a line connecting a longitudinal direction of the blades is defined as a span, a cycle of the wave may be set within a range of 30% to 12% of a height of a direction of the span.

An amplitude of the wave may be 0.2 to 2 times a thickness of the blades. With respect to a direction from the leading edge to the trailing edge, the partitioning line and the leading edge may be spaced apart from each other by a distance corresponding to 50% to 70% of a length of the span.

An upper end of the partitioning line may be connected to an upper edge of the blades. A lower end of the partitioning line may be connected to a lower edge of the blades.

The shroud may include a suction guide that forms the suction port, and a shroud guide inclined radially outward from an upper end of the suction port. The lower end of the partitioning line may be disposed at an upper part or portion of the suction guide. The partitioning line may be disposed radially outward of the suction guide.

While embodiments have been particularly shown and described with reference to exemplary embodiments thereof, it will be understood by those skilled in the art that embodiments are not limited to those exemplary embodiments and various changes in form and details may be made therein without departing from the scope and spirit as defined by the appended claims and should not be individually understood from the technical spirit or prospect.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidification and air cleaning apparatus, comprising:
   a hub to which a rotational shaft is coupled;
   a shroud spaced apart from the hub and having a suction port formed at a center thereof, through which air is drawn; and
   a plurality of blades disposed between the hub and the shroud and coupled to the hub and the shroud, wherein the plurality of blades include a wave formed in a direction from the shroud toward the hub and formed with ridges and valleys, and having a predetermined cycle, wherein the plurality of blades comprises:
      a first blade coupled to the hub and the shroud and having a trailing edge; and
      a second blade coupled to the hub and the shroud, integrally formed with the first blade, and having a leading edge, and wherein the wave is formed on the first blade.

2. The apparatus of claim 1, wherein the wave extends to the trailing edge.

3. The apparatus of claim 1, further comprising a partitioning line formed by injection molding and disposed between the first blade and the second blade.

4. The apparatus of claim 3, wherein the wave is formed from the partitioning line toward the trailing edge with respect to the rotational shaft.

5. The apparatus of claim 3, wherein the ridges and the valleys extend lengthwise from the partitioning line toward the trailing edge.

6. The apparatus of claim 5, wherein the ridges and the valleys extend to the trailing edge.

7. The apparatus of claim 1, wherein when a line that extends in a longitudinal direction of the plurality of blades and connects a leading edge and a trailing edge is defined as a span, the ridges and the valleys are formed along the span.

8. The apparatus of claim 3, wherein when a line that extends in a longitudinal direction of the plurality of blades and connects a leading edge and a trailing edge is defined as a span, the partitioning line and the leading edge are spaced apart from each other by a distance corresponding to 50% to 70% of a length of the span.

9. The apparatus of claim 3, wherein an upper end of the partitioning line extends to an upper edge of the plurality of blades.

10. The apparatus of claim 3, wherein a lower end of the partitioning line extends to a lower edge of the plurality of blades.

11. The apparatus of claim 3, wherein the shroud comprises:
    a suction guide that forms the suction port; and
    a shroud guide inclined radially outward from an upper end of the suction port, wherein a lower end of the partitioning line is disposed at an upper portion of the suction guide.

12. The apparatus of claim 11, wherein the partitioning line is disposed radially outward of the suction guide.

13. A humidification and air cleaning apparatus, comprising:
    a hub to which a rotational shaft is coupled;
    a shroud spaced apart from the hub and having a suction port formed at a center thereof, through which air is drawn; and
    a plurality of blades disposed between the hub and the shroud and coupled to the hub and the shroud, wherein the plurality of blades include a wave formed in a direction from the shroud toward the hub and formed with ridges and valleys, and having a predetermined cycle, and wherein when a line that extends in a longitudinal direction of the plurality of blades and connects a leading edge and a trailing edge is defined as a span, a cycle of the wave is within a range of 30% to 12% of a height along a direction of the span.

14. A humidification and air cleaning apparatus, comprising:
    a hub to which a rotational shaft is coupled;
    a shroud spaced apart from the hub and having a suction port formed at a center thereof, through which air is drawn; and
    a plurality of blades disposed between the hub and the shroud and coupled to the hub and the shroud, wherein the plurality of blades include a wave formed in a direction from the shroud toward the hub and formed with ridges and valleys, and having a predetermined cycle, and wherein an amplitude of the wave is 0.2 to 2 times a thickness of the plurality of blades.

15. A humidification and air cleaning apparatus, comprising:
    a hub to which a rotational shaft is coupled;
    a shroud spaced apart from the hub and having a suction port formed at a center, through which air is drawn; and
    a plurality of blades having a first end coupled to the hub and a second end coupled to the shroud, wherein the plurality of blades have a wave formed with ridges and valleys disposed between the ridges, the ridges and the valleys being formed in a region adjacent to the shroud, and wherein when a line that connects a longitudinal direction of the plurality of blades and connects a leading edge and a trailing edge is defined as a span, a cycle of the wave is within a range of 30% to 12% of a height along a direction of the span.

16. The apparatus of claim 15, wherein the ridges protrude toward a constant-pressure surface of the plurality of blades, and the valleys protrude toward a suction surface of the plurality of blades.

17. The apparatus of claim 15, wherein when a line that connects a longitudinal direction of the plurality of blades and connects a leading edge and a trailing edge is defined as a span, the ridges and the valleys are formed along the span.

18. The apparatus of claim 15, wherein the plurality of blades comprises:
- a first blade coupled to the hub and the shroud and having a trailing edge; and
- a second blade coupled to the hub and the shroud, integrally formed with the first blade, and having a leading edge, wherein the wave is formed on the first blade.

\* \* \* \* \*